(12) United States Patent
Lusted et al.

(10) Patent No.: US 9,031,093 B2
(45) Date of Patent: May 12, 2015

(54) EEE REFRESH AND WAKE SIGNALING FOR 100GBASE-KP4

(71) Applicant: Intel Corporation, Santa Clara, CA (US)

(72) Inventors: Kent C. Lusted, Aloha, OR (US); Adee O. Ran, Maayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 13/758,259

(22) Filed: Feb. 4, 2013

(65) Prior Publication Data

US 2014/0161141 A1    Jun. 12, 2014

Related U.S. Application Data

(60) Provisional application No. 61/734,120, filed on Dec. 6, 2012.

(51) Int. Cl.
| | | |
|---|---|---|
| *H04J 3/16* | (2006.01) | |
| *H04L 12/12* | (2006.01) | |
| *H04L 12/40* | (2006.01) | |

(52) U.S. Cl.
CPC .......... *H04L 12/12* (2013.01); *H04L 12/40039* (2013.01); *H04L 12/40136* (2013.01)

(58) Field of Classification Search
USPC .......... 370/468, 252, 253, 292, 389, 311, 392, 370/470, 471, 241, 356, 242, 231, 235, 353
See application file for complete search history.

(56) References Cited

U.S. PATENT DOCUMENTS

| | | | | |
|---|---|---|---|---|
| 7,606,149 | B2 * | 10/2009 | Kumar et al. | ........... 370/229 |
| 2013/0343400 | A1 | 12/2013 | Lusted et al. | |
| 2014/0086264 | A1 | 3/2014 | Lusted et al. | |
| 2014/0146833 | A1 * | 5/2014 | Lusted et al. | ........... 370/437 |

OTHER PUBLICATIONS

IEEE, "Draft Standard for Ethernet-IEEE P802.3bj™/D1.1", Amendment to IEEE Std 802.3-201X, Aug. 13, 2012, 220 pages.
IEEE, "IEEE Standard for Ethernet—Section Five", IEEE Std 802.3, 2012, 844 pages.

(Continued)

*Primary Examiner* — Chi H Pham
*Assistant Examiner* — Alexander O Boakye
(74) *Attorney, Agent, or Firm* — Law Office of R. Alan Burnett, P.S.

(57) ABSTRACT

Methods, apparatus and systems for implementing for implementing Energy-Efficient Ethernet (EEE) refresh and wake signaling for high-speed Ethernet links. During an EEE refresh or wake signaling period, ALERT frames are transmitted between first and second Ethernet interfaces on opposing ends of the link, with a first ALERT frame being sent from a first Ethernet interface and a second ALERT frame being returned from the second Ethernet interface. The ALERT frames have a length that is different that the length of Physical Media Attachment (PMA) frames, and the returned ALERT frames include frame alignment offset data identifying a relative offset between an ALERT frame and a predetermined location in a PMA frame, and countdown data. The frame alignment offset data and countdown data are employed to facilitate a rapid transition from the link training mode to the data mode.

30 Claims, 28 Drawing Sheets

(56) References Cited

OTHER PUBLICATIONS

IEEE, "IEEE Standard for Ethernet—Section Four", IEEE Std. 802.3, 2012, 732 pages.

IEEE, "IEEE Standard for Ethernet—Section Six", IEEE Std. 802.3, 2012, 400 pages.

* cited by examiner

PAM4 Encoding

3 ⟹ +1
2 ⟹ +1/3
1 ⟹ -1/3
0 ⟹ -1

| Cell(s) | Name | Description |
|---|---|---|
| 15:14 | Reserved | Transmitted as 0, ignored on reception. |
| 13 | Preset | 1 = Preset coefficients<br>0 = Normal operation |
| 12 | Initialize | 1 = Initialize coefficients<br>0 = Normal operation |
| 11:7 | Reserved | Transmitted as 0, ignored on reception. |
| 6 | Parity | Even parity of all other coefficient update cells. |
| 5:4 | Coefficient (+1) update | 5 4<br>1 1 = reserved<br>0 1 = increment<br>1 0 = decrement<br>0 0 = hold |
| 3:2 | Coefficient (0) update | 3 2<br>1 1 = reserved<br>0 1 = increment<br>1 0 = decrement<br>0 0 = hold |
| 1:0 | Coefficient (−1) update | 1 0<br>1 1 = reserved<br>0 1 = increment<br>1 0 = decrement<br>0 0 = hold |

*Fig. 7*

| Cell(s) | Name | Description |
|---|---|---|
| 19 | Parity | Set to achieve even parity for status report field. |
| 18:14 | Reserved | Transmitted as zeros. |
| 13:12 | Training frame countdown | Number of training frames remaining before transition to data mode. |
| 11:6 | PMA alignment offset | Relative location of the next training frame within the PMA frame. |
| 6 | Receiver ready | 1 = The local receiver has determined that training is complete and is prepared to receive data.<br>0 = The local receiver is requesting that training continue. |
| 5:4 | Coefficient (+1) status | 5 4<br>1 1 = maximum<br>1 0 = minimum<br>0 1 = updated<br>0 0 = not_updated |
| 3:2 | Coefficient (0) status | 3 2<br>1 1 = maximum<br>1 0 = minimum<br>0 1 = updated<br>0 0 = not_updated |
| 1:0 | Coefficient (−1) status | 1 0<br>1 1 = maximum<br>1 0 = minimum<br>0 1 = updated<br>0 0 = not_updated |

*Fig. 8*

| training frame word # | | | | | | | |
|---|---|---|---|---|---|---|---|
| 1 | Bit pattern | 11111111 | 11111111 | Marker 11100000000 | 0000000000 | 000000 | frame marker |
| 2 | DME | cell 15 | cell 14 | cell 13 | cell 12 | overhead | coef update |
| | Bit pattern | 11111111 | 00000000 | 11111111 | 00000000 | 11000 | |
| | Cell value | | 0 | | 0 | 1 | |
| 3 | DME | cell 11 | cell 10 | cell 9 | cell 8 | overhead | coef update |
| | Bit pattern | 11111111 | 00000000 | 11111111 | 00000000 | 11000 | |
| | Cell value | | 0 | | 0 | 1 | |
| 4 | DME | cell 7 | cell 6 | cell 5 | cell 4 | overhead | coef update |
| | Bit pattern | 11111111 | 00000000 | 11111111 | 00000000 | 11000 | |
| | Cell value | | 0 | | 0 | 1 | |
| 5 | DME | cell 3 | cell 2 | cell 1 | cell 0 | overhead | coef update |
| | Bit pattern | 11111111 | 00000000 | 11111111 | 00000000 | 11000 | |
| | Cell value | | 0 | | 0 | 1 | |

*Fig. 12a*

| training frame word # | | | | | |
|---|---|---|---|---|---|
| 1 | Bit pattern | 1111111111 | 1111111111 | Marker 1110000000 | 0000000000 | 000000 | frame marker |
| 2 DME | Bit pattern | 1111111111 | cell 15 0000000 | cell 14 000000000 | cell 13 1111100000 | cell 12 1111111111 | overhead 000111 | coef update |
| | Cell value | 0 | 0 | 0 | 1 | 1 | |
| 3 DME | Bit pattern | 000000000 | cell 11 1111111111 | cell 10 1111111111 | cell 9 000000000 | cell 8 1111111111 | overhead 000111 | coef update |
| | Cell value | 0 | 0 | 0 | 1 | 1 | |
| 4 DME | Bit pattern | 000000000 | cell 7 1111100000 | cell 6 1111100000 | cell 5 1111111111 | cell 4 000000000 | overhead 111000 | coef update |
| | Cell value | 0 | 0 | 1 | 0 | 0 | |
| 5 DME | Bit pattern | 1111111111 | cell 3 0000000 | cell 2 000000000 | cell 1 1111111111 | cell 0 000000000 | overhead 111000 | coef update |
| | Cell value | 0 | 0 | 0 | 0 | 0 | |

*Fig. 12b*

| TFW | 45:36 | 35:26 | 25:16 | 15:6 | 5:0 | |
|---|---|---|---|---|---|---|
| 1 | Marker | | | | | frame marker |
| 2 | cell 15 | cell 14 | cell 13 | cell 12 | overhead | coef update |
| 3 | cell 11 | cell 10 | cell 9 | cell 8 | overhead | coef update |
| 4 | cell 7 | cell 6 | cell 5 | cell 4 | overhead | coef update |
| 5 | cell 3 | cell 2 | cell 1 | cell 0 | overhead | coef update |
| 6 | cell 19 | cell 18 | cell 17 | cell 16 | overhead | status report |
| 7 | cell 15 | cell 14 | cell 13 | cell 12 | overhead | status report |
| 8 | cell 11 | cell 10 | cell 9 | cell 8 | overhead | status report |
| 9 | cell 7 | cell 6 | cell 5 | cell 4 | overhead | status report |
| 10 | cell 3 | cell 2 | cell 1 | cell 0 | overhead | status report |
| 11 | trng patn | trng patn | trng patn | trng patn | training pattern | training pattern |
| 12 | trng patn | trng patn | trng patn | trng patn | training pattern | training pattern |
| 13-56 | trng patn | trng patn | trng patn | trng patn | training pattern | training pattern cont'd |
| 57 | trng patn | trng patn | trng patn | trng patn | training pattern | training pattern |

| Lane | Output of | Contents of first 2 TFWs (from left to right, top to bottom) |
|---|---|---|
| L0 | PRBS | 0100100110110011110001010101000010010011101111001110011101101110011100101011<br>000111111001011101101111111010000010111110010110111010101010111000011100001101011 |
| L0 | Gray code | 1031320201113010312121200121210213103131112<br>0122211352210112723123203203023031238133562 |
| L0 | Precoder | 1301200301010303011233222320110021052320<br>011110103332211100110331138831122550031211 |
| L1 | PRBS | 110111110101010000000010101011100001010111001101110011101000000110100110110<br>100110011001110011101011111108011011010101011110101110011110110010101102013.1003112.2 |
| L1 | Gray code | 212211100031013123033320010232202300231323<br>310203030772323221220221223311312031 |
| L1 | Precoder | 23332222210020122122113123120203000212502<br>30002120311121203112023220230301235312330 |
| L2 | PRBS | 11001011100000111101101111011000110010110001100010101101110000000110<br>0011101000001010010101931010310130213202002332302023020111 |
| L2 | Gray code | 203220023232320203302300202032300023<br>021301303310323333000310022123725532020031111 |
| L2 | Precoder | 221131112035022002203112200022230200722000021<br>0230012120013113211231135121331301113031330 |
| L3 | PRBS | 010311110001111011110101110131010101110101011100001010001010100111110000<br>10010010011109100100300101011111011080011001111100000010111010101110000 |
| L3 | Gray code | 122201252332021312002133322023011302032230<br>0132223051363112293332131102220111033331010 |
| L3 | Precoder | 1203310121113320120333332120233122013023102013<br>023353233022020023332202023323323201120131 |

*Fig. 18*

EEE REFRESH AND WAKE SIGNALING FOR 100GBASE-KP4

CROSS-REFERENCE TO RELATED APPLICATIONS

This application claims the benefit of the filing date of U.S. Provisional Application No. 61/734,120, filed Dec. 6, 2012, entitled "EEE REFRESH AND Wake signaling for 100GBASE-KP4" under 35 U.S.C. §119(e).

FIELD OF THE INVENTION

The field of invention relates generally to Ethernet-based interconnects and, more specifically but not exclusively relates to techniques for implementing Energy-Efficient Ethernet (EEE) refresh and wake signaling for high-speed Ethernet links.

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever substantial capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, in addition to the deployment of massive data centers to support these services which employ private network infrastructure.

A typical data center deployment includes a large number of server racks, each housing multiple rack-mounted servers or blade servers. Communications between the rack-mounted servers is typically facilitated using the Ethernet (IEEE 802.3) protocol over copper wire cables. In addition to the option of using wire cables, blade servers and network switches and routers may be configured to support communication between blades or cards in a rack over an electrical backplane or mid-plane interconnect.

In recent years, the speed of Ethernet connections over copper wiring has reached the 10 Gigabits per second (Gpbs) and 40 Gpbs level. Moreover, The IEEE (Institute of Electrical and Electronics Engineers) is currently developing a specification (IEEE 802.3bj) defining a new backplane PHY type called 100GBASE-KP4 that is targeted for a bandwidth of 100Gbps over electrical backplanes with a loss up to 33 dB at 7 GHz. A similar specification for a new 100Gbps over a cable connection is also being defined by the IEEE.

Energy-Efficient Ethernet (EEE) is an optional capability that combines the IEEE 802.3 Media Access Control (MAC) Sublayer with a family of Physical Layers defined to support operation in the Low Power Idle (LPI) mode. When the LPI mode is enabled, systems on both sides of the link can save power during periods of low link utilization. EEE also provides a protocol to coordinate transitions to or from a lower level of power consumption and does this without changing the link status and without dropping or corrupting frames. The transition time in to and out of the lower level of power consumption is kept small enough to be transparent to upper layer protocols and applications.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7 is a table illustrating exemplary encodings for cells in Coefficient Update fields;

FIG. 8 is a table illustrating exemplary encodings for cells in Status Report fields;

FIG. 9b is a schematic diagram illustrating further details of selected LAN CSMA/CD layers in FIG. 9a;

FIGS. 12a and 12b are data structure diagrams illustrating the Frame Marker and Coefficient Update portions of an ALERT Frame, and further illustrating respective parity schemes, according to one embodiment;

FIG. 13 is a diagram of a data structure illustrating an ALERT frame, accordingly to one embodiment;

FIG. 18 illustrates an exemplary set of four PRBS13 initiation states;

FIG. 19b is a rear isometric view of the blade server chassis of FIG. 16a;

DETAILED DESCRIPTION

Embodiments of methods, apparatus and systems for implementing Energy-Efficient Ethernet (EEE) refresh and wake signaling for high-speed Ethernet links are described herein. In the following description, numerous specific details are set forth (such as implementation of a 100Gbps Ethernet link) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments for facilitating EEE refresh and wake signaling for high-speed Ethernet links including the proposed 100GBASE-KP4 PHY are disclosed herein. In order to preserve compatibility with existing training mechanisms, some aspects of link training for the 100GBASE-KP4 PHY are common to similar aspects defined for the IEEE 10GBASE-KR PHY, which is targeted at 10Gbps links and is currently employed in various types of equipment such as switches and routers. Additionally, there are other common aspects that are defined in IEEE Std 802.3ap-2007. While these common aspects may be identified and briefly discussed herein, corresponding detailed discussions of how these aspects may operate or be implemented are generally not provided herein in order to not obscure inventive aspects of the embodiments. Other aspects of some embodiments are described in further detail in IEEE P802.3bj Draft 1.2 and IEEE P802.3bh Draft 3.1.

Figures 1, 2:
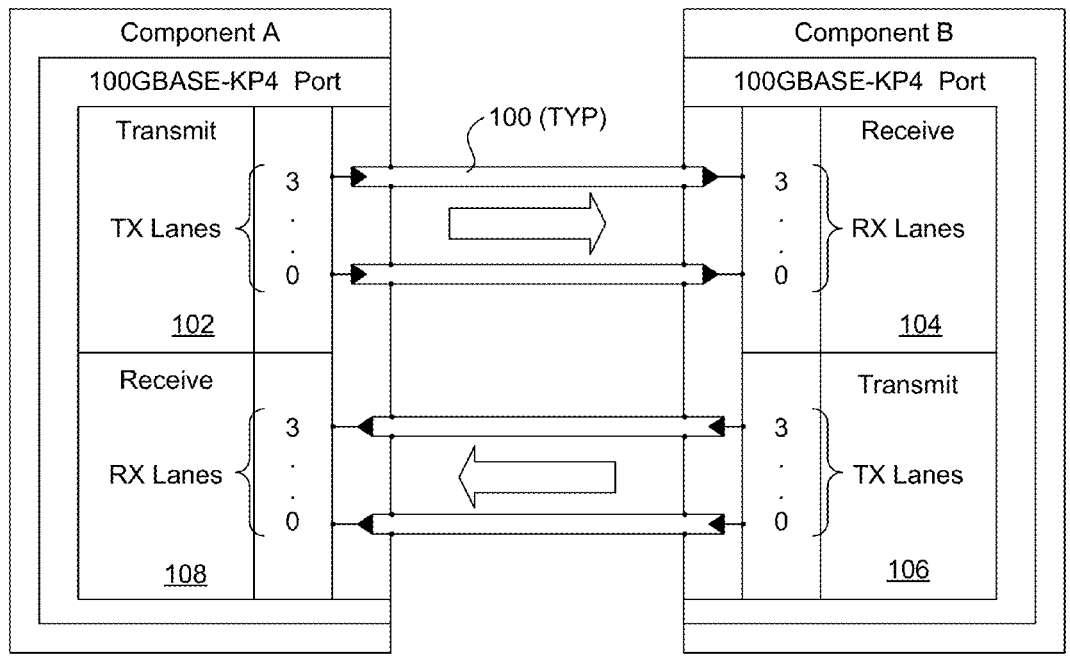
FIG. 1 is a schematic diagram illustrating the structure of a 100GBASE-KP4 link, according to one embodiment.
FIG. 2 is a diagram illustrating mapping for PAM4 encoding.

The Physical layer (also referred to a "PHY") structure of one embodiment of a 100GBASE-KP4 link is illustrated in FIG. 1. The PHY defines the physical structure of the interconnect and is responsible for dealing with details of operation of the signals on a particular link between two link partners, such as depicted by components A and B. This layer manages data transfer on the signal wires, including electrical levels, timing aspects, and logical issues involved in sending and receiving each bit of information across the parallel lanes. As shown in FIG. 1, the physical connectivity of each interconnect link is made up of four differential pairs of signals 100, comprising lanes 0-3 in each direction. Each port supports a link pair consisting of two uni-directional links to complete the connection between two components. This supports traffic in both directions simultaneously.

Components with 100GBASE-KP4 ports communicate using a pair of uni-directional point-to-point links, defined as a link pair, as shown in FIG. 1. Each port comprises a Transmit (Tx) link interface and a Receive (Rx) link interface. For the illustrated example, Component A has a Tx port 102 that is connected to Component B Rx port 104. Meanwhile, Component B has a Tx port 104 that is connected to Component B Rx port 108. One uni-directional link transmits from Component A to Component B, and the other link transmits from Component B to Component A. The "transmit" link and "receive" link is defined relative to which component port is transmitting and which is receiving data. In the configuration illustrated in FIG. 1, the Component A transmit link transmits data from the Component A Tx port 102 to the Component B Rx port 104. This same Component A transmit link is the Port B receive link.

The 100GBASE-KP4 PHY uses a 4-level pulse amplitude modulation (referred to as PAM4) signal to send and receive data across the channel. As shown in FIG. 2, PAM4 consists of four logical levels that are mapped as follows:

| 0 | maps to −1 |
| 1 | maps to −1/3 |
| 2 | maps to +1/3 |
| 3 | maps to +1 |

Logical levels 0 and 3 respectively correspond to low and high level signals having signal levels −1 and +1, while logical levels 1 and 2 correspond to intermediate level signals have signal levels −⅓ and +⅓.

The physical signaling for the 100GBASE-KP4 PHY employs a Unit Interval (UI) having a time corresponding to 13.59375 Gbd symbols (~73.6 psec). In one embodiment a Training Frame Word (TFW) of 46 UI is employed for link training Each TFW corresponds to one full 92-bit terminated blocks (TB92).

Figure 3:
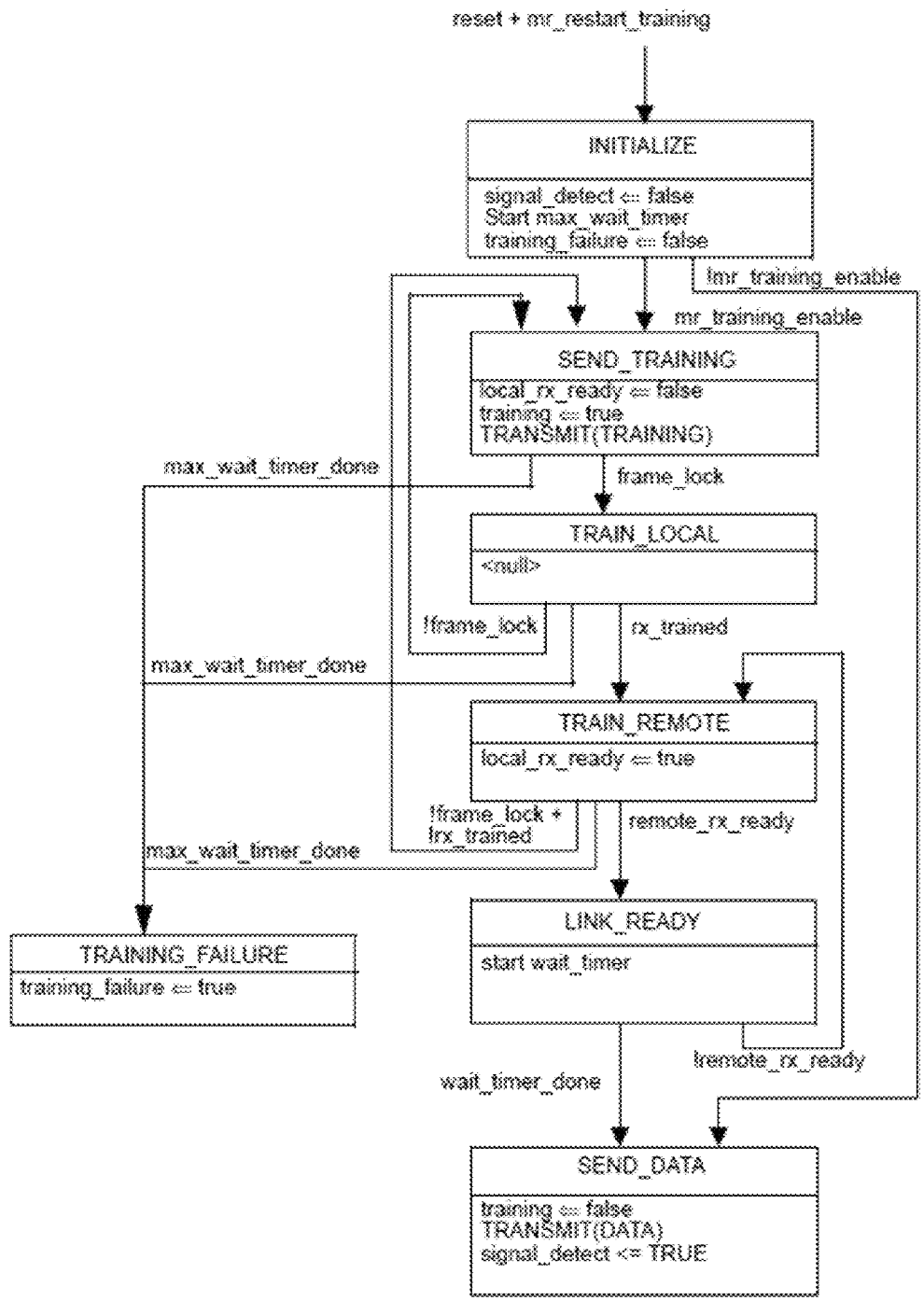
FIG. 3 is a training state diagram for a 10GBASE-KR PHY.

In one embodiment, the format for the training sequence for the 100GBASE-KP4 PHY is similar to that employed for the 10GBASE-KR PHY defined in the IEEE Std. 802.3ap-2007 specification. The training state diagram for 10GBASE-KR PHY is shown in FIG. 3. A significant difference between the 10GBASE-KR PHY and the 100GBASE-KP4 PHY is that the former defines a NRZ (Non-return to Zero) 2-level (PAM2) PHY rather than a 4-level PAM4 signal.

Figure 4A:
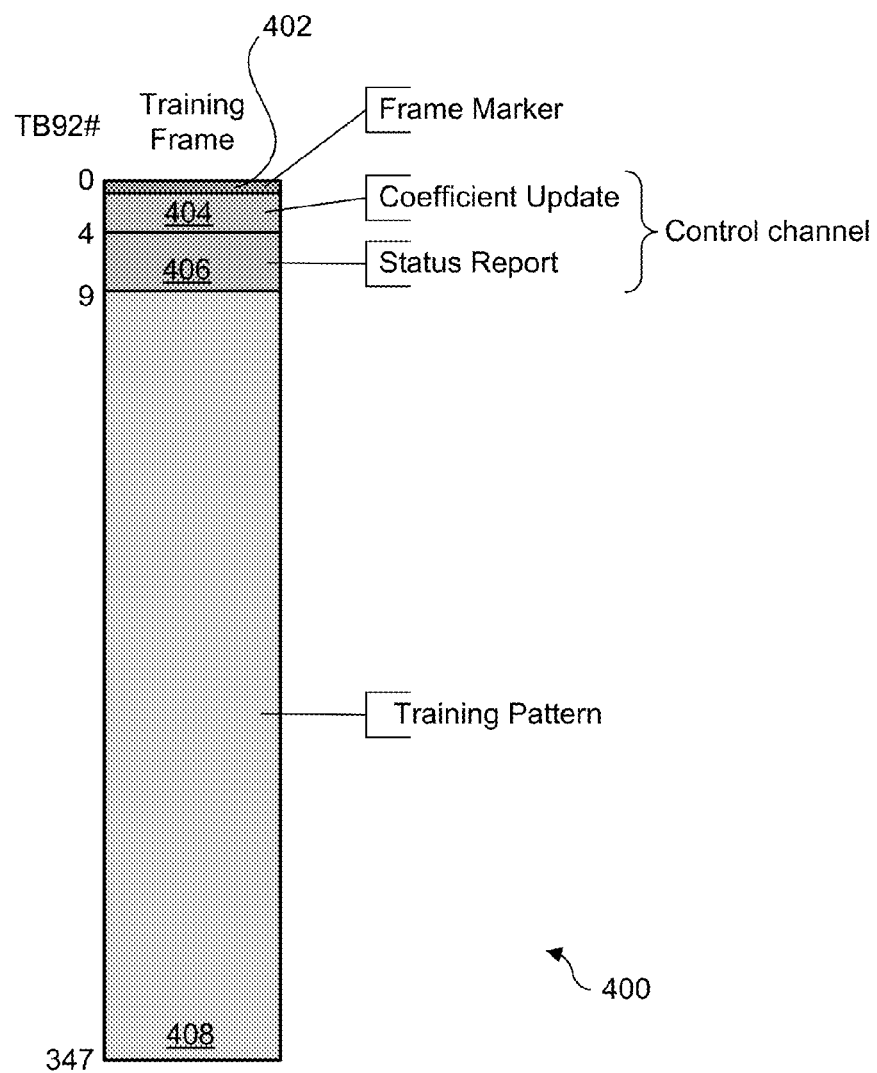
FIG. 4a is a diagram showing the components of a training frame, according to one embodiment.
Figure 4B:
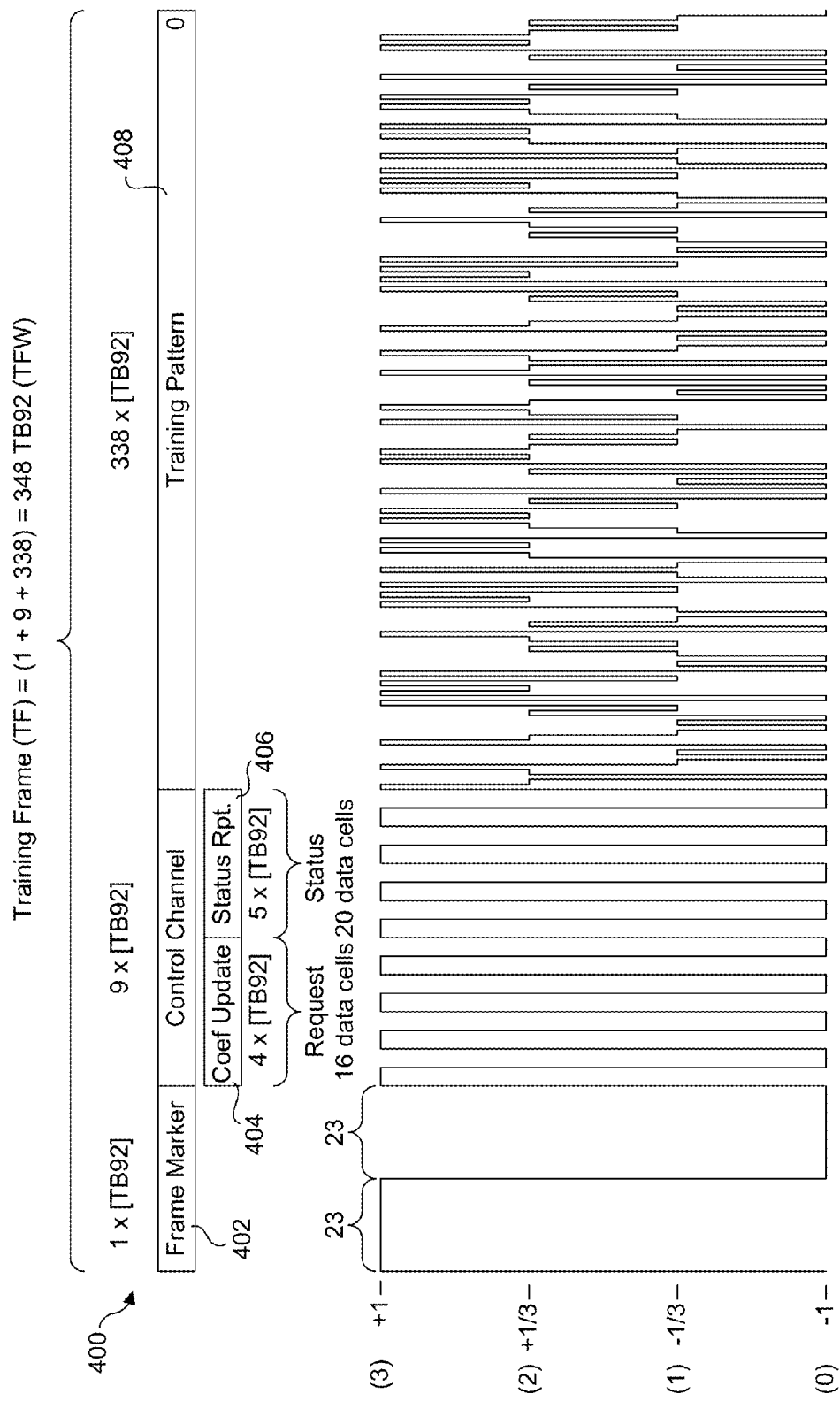
FIG. 4b is a schematic diagram illustrating a training frame and exemplary signaling, according to one embodiment.

The 100GBASE-KP4 link is established using the following sequence:
(1) Auto-negotiate capabilities to link partner
(2) Send out training sequence to tune PHY for the channel's characteristics
   Obtain Frame Lock
   TX FFE handshake: Adapt Tx coefficients to channel characteristics
   DSP converged: Train Rx to channel
   Status Exchange: Ready or not?
(3) Countdown to data mode and Send out idle symbols The training frame is a fixed length structure that is sent continuously during training. As shown in FIG. 4a, in one embodiment, a training frame 400 includes a Frame Marker 402 comprising 1 TB92, a Control Channel including a Coefficient Update 404 comprising 4 TB92 and a Status Report 406 comprising 5 TB92, and a Training Pattern 408 comprising 338 TB92 for a total of length of 348 TB92s or 348 TFWs. Further details of training frame 400 are shown in FIG. 4b and discussed below.

In one embodiment, training Frames are delimited by the bit pattern, hexadecimal 3FFFFFF800000 (23 ones followed by 23 zeros in which the ones are +1 PAM4 symbols and the zeros are −1 PAM4 symbols), as expressed in 13.59375 Gbd symbols. This is illustrated by the Frame Markers shown in FIGS. 4b, 5a, 5b, 12a, 12b, and 13 and 14.

Figure 6:
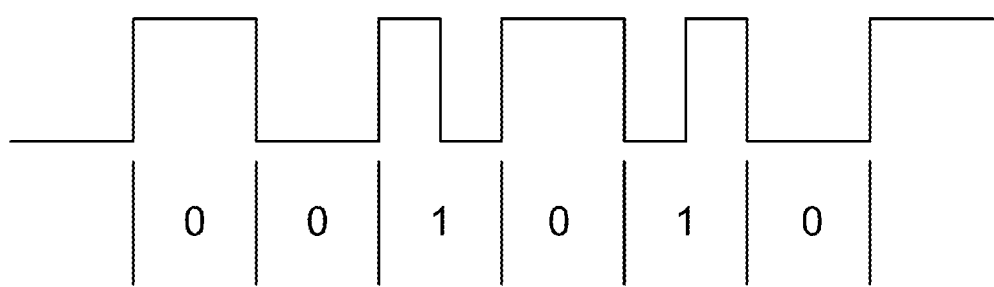
FIG. 6 is a diagram illustrating differential Manchester coding.

The control channel is transmitted using differential Manchester encoding DME. An example of DME is shown in FIG. 6. The rules of differential Manchester encoding are as follows:
   a) A data transition shall occur at each cell boundary.
   b) A mid-cell data transition shall be used to signal a logical one.
   c) The absence of a mid-cell data transition shall be used to signal a logical zero.

If a coding violation is detected within the bounds of the control channel in a given training frame, the contents of the control channel for that frame are ignored.

Figure 5A:
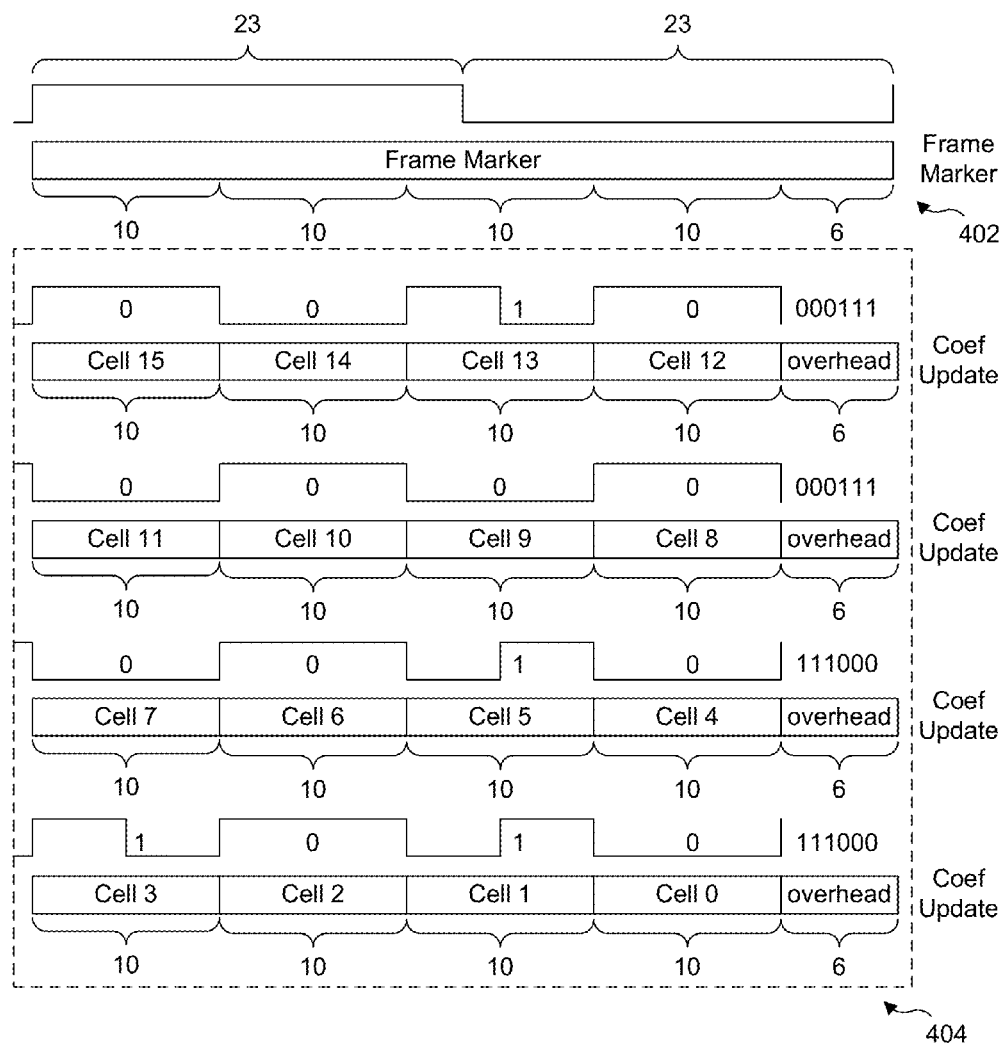
FIG. 5a shows an exemplary structure for a Frame Marker and Coefficient Update portion of an ALERT frame, according to one embodiment.
Figure 5B:
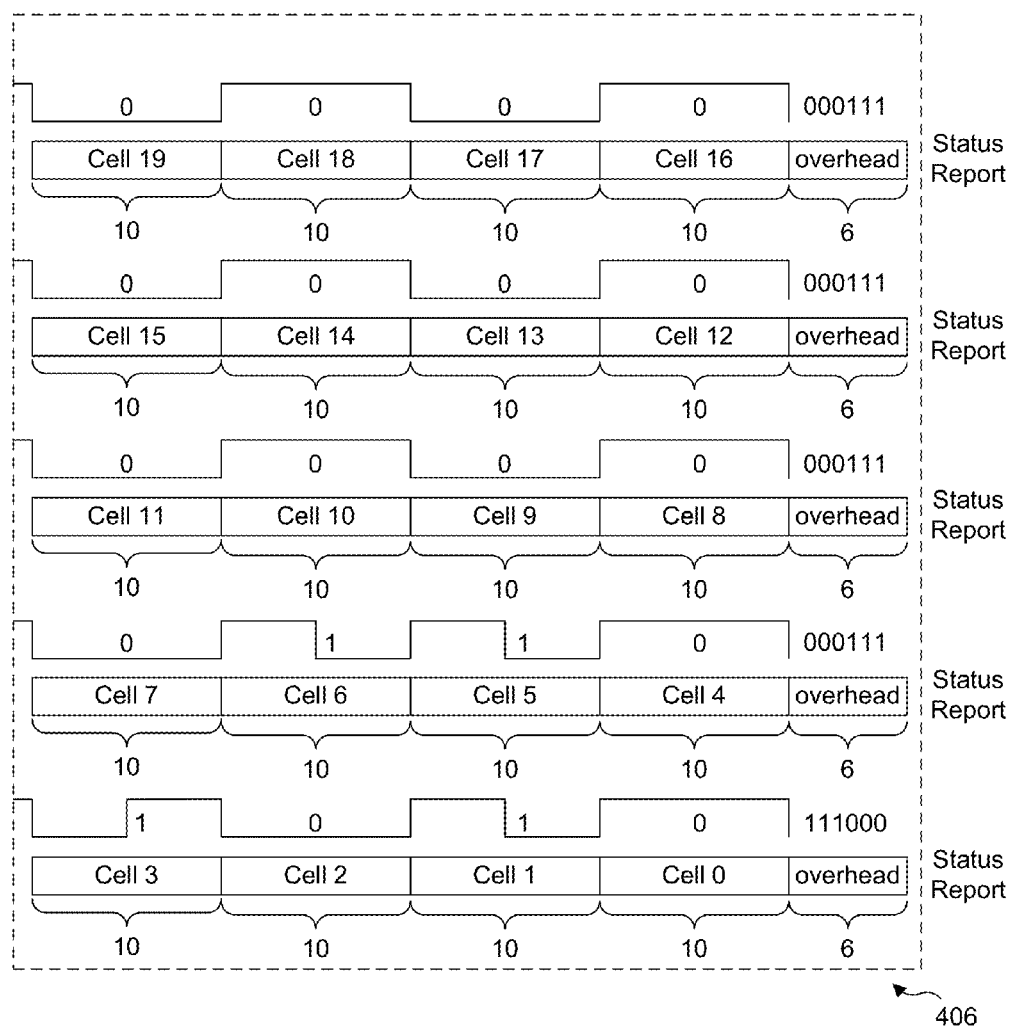
FIG. 5b shows an exemplary structure for a Status Report portion of an ALERT frame, according to one embodiment.

As shown in FIGS. 4b, 5a and 5b, in one embodiment Coefficient Update 404 comprises a 16 data cell request, while Status Report 406 comprises a 20 data cell Status. The length for the cells in each of Coefficient Update 404 and Status Report 406 is 10 UI, and each of the 4 TFWs are configured as four cells followed by a 6 UI overhead field, resulting in a control channel length of 9×46=414 UI. In one embodiment the cells in Coefficient Update 404 are mapped to corresponding coefficient update fields shown in FIG. 7, while the cells in Status Report 406 are mapped to corresponding status report fields shown in FIG. 8.

Figure 9A:
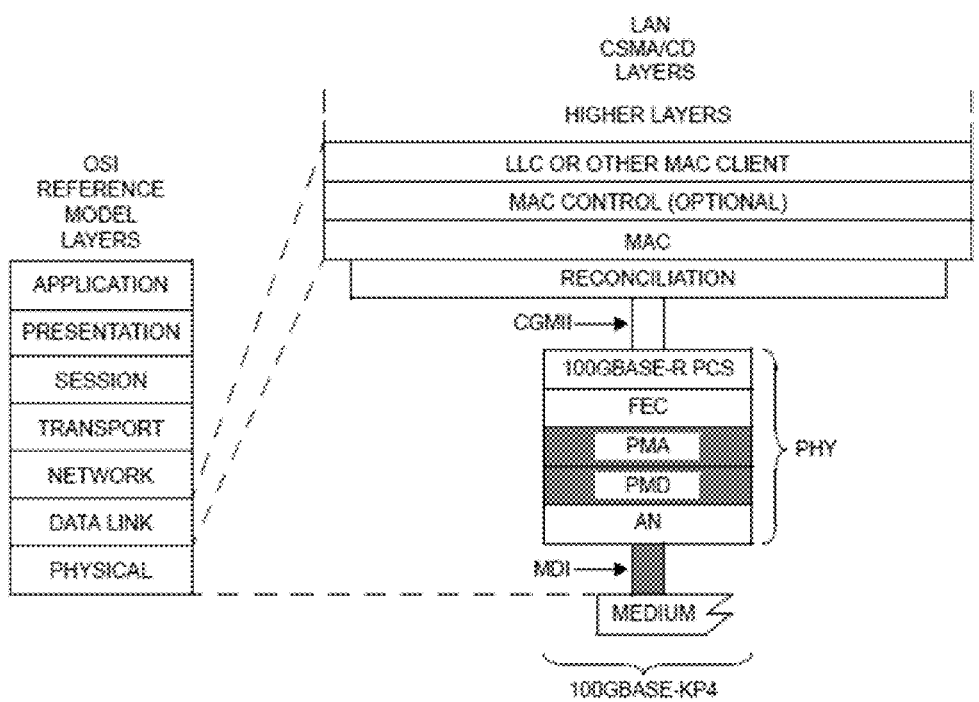
FIG. 9a is a schematic diagram illustrating the relationship between the Data Link and Physical layers of the OSI reference model and IEEE 802.3 LAN CSMA/CD LAN model layers corresponding to the current draft of 100GBASE-KP4 defined in IEEE P802.3bj Draft 1.2.
Figure 9B:
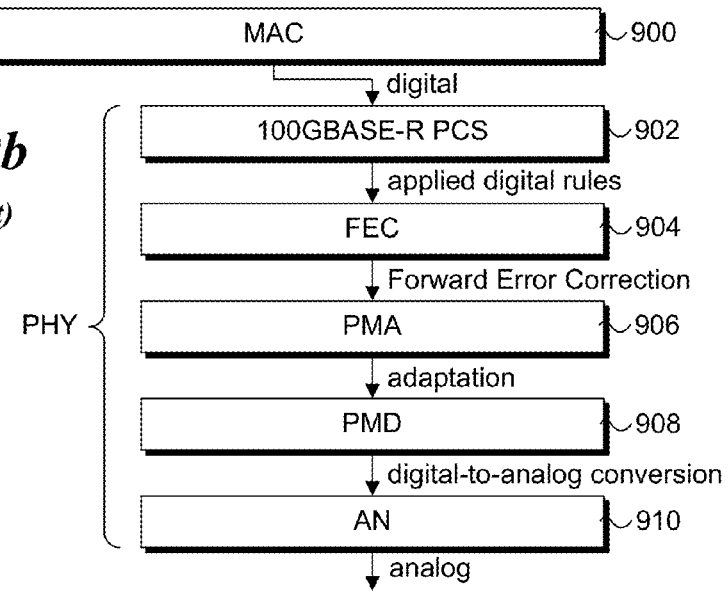

FIG. 9a shows details of the relationship between the Data Link and Physical layers of the OSI reference model and IEEE 802.3 LAN CSMA/CD LAN model layers corresponding to the current draft of 100GBASE-KP4 defined in IEEE P802.3bj Draft 1.2. FIG. 9b shows further details of selected LAN CSMA/CD layers, including a MAC (Media Access Control) layer 900, a 100GBASE-R Physical Coding Sublayer (PCS) sublayer 902, a Forward Error Correction (FEC) sublayer 904, a Physical Media Attachment (PMA) sublayer 906, a Physical Media Dependent (PMD) sublayer 908, and an Auto-Negotiation (AN) sublayer 910. Data is received in digital format as a binary bit stream by MAC layer 900, which processes and forwards the binary data to 100GBASE-R PCS sublayer 902, which applies digital rules to the binary data to transform the data as described below. The transformed digital data are then passed to FEC sublayer 904, which performs Forward Error Correction. FEC uses the coding gain to increase the link budget and BER performance on a given channel. The link budget consists of the electrical parameters which define the connection between the transmit circuitry and the receive circuitry, such as insertion loss, return loss, pulse response, etc.

In the transmit direction, the role of PMA sublayer 906 is to adapt the signal output by FEC sublayer 904 to a PAM4 encoded signal to be passed to PMD sublayer 908 and AN sublayer 910 for transfer over the attached medium. One embodiment of the adaptation processes shown in FIG. 10 includes an insert overhead block 1002, an insert termination bits block 1004, a Gray coding block 1006, a [1/(1+D) mod 4] precoding block 1008, and a PAM4 encoding block 1010.

Figure 10:
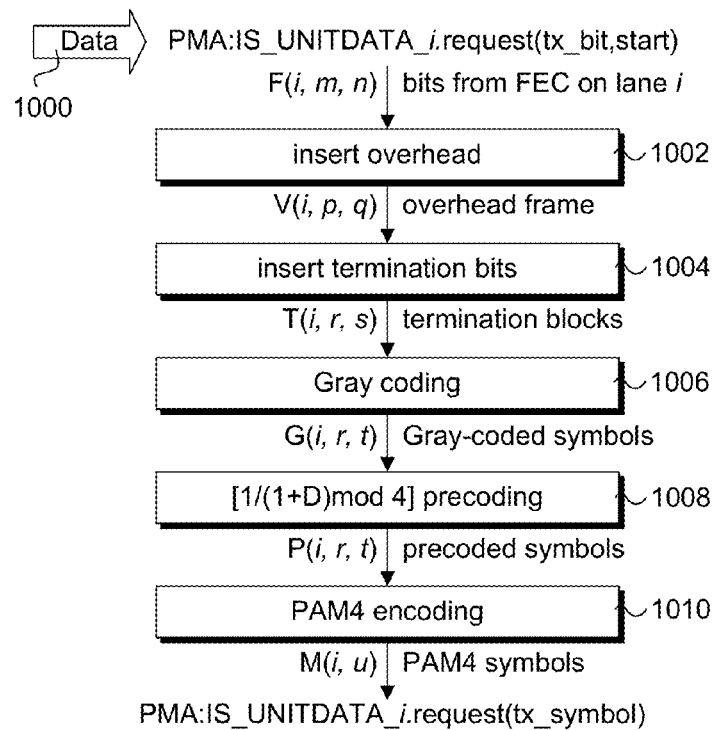
FIG. 10 is a transmit adaption process diagram illustrating operations performed by the PMA sublayer during link up transmit operations.

In further detail, incoming data 1000 in FIG. 10 is received by PMA sublayer 906 from FEC sublayer 904 comprising a PMA:IS_UNITDATA_i.request (where i=0 to 3) primitive used to define the transfer of four streams of a data from the PMA client to PMA. The data conveyed by PMA:IS_UNITDATA_0.request to PMA:IS_UNITDATA_3.request consists of four parallel streams of encoded bits, one stream for each of lanes 0-3. Each tx_bit parameter is either a '1' or '0'. The start parameter is TRUE to indicate that the concurrent tx_bit is the first bit of the first, second, third, or fourth FEC symbol in the FEC codeword, or is otherwise FALSE. On each transaction, tx-bit is assigned F(i, m, n), where i is the lane number, m is an index indicating the FEC codeword number and increments at the start of each codeword, and n is an index indicating the bit number within the codeword.

Insert overhead block 1002 creates a sequence of overhead frames by inserting 40 overhead bits for every 31280 FEC bits. The FEC bits, F(i, m, n) are mapped into a continuous sequence of overhead frames. The overhead frame is 31320 bits in length. Each bit in the overhead frame is denoted V(i, p, q), where: i is the lane number; p is an index that indicates the frame number and increments at the start of each frame; and q is an index that indicates the bit number within a frame with a range 1 to 31320. The first 40 bits of the frame, V(i, p, 1) to V(i, p, 40) are the overhead bits. The next 31280 bits, V(i, p, 41) to Vi, p, 31320) are composed of the bits from 23 consecutive FEC codewords.

The overhead bits are inserted in the frame as follows:
V(i, p, 1)=H(i, p, 1)
V(i, p, 2)=H(i, p, 2)
V(i, p, . . . )=H(i, p, . . . )
V(i, p, 40)=H(i, p, 40)

The FEC codeword bits are aligned such that V(i, p, 41) is the first bit of a codeword, e.g., V(i, p, 41)=F(i, m, 1). The FEC bits are inserted into the frame in the order in which they were received from the FEC, e.g., V(i, p, 42)=F(i, m, 2), V(i, p, 43)=F(i, m, 3), and so on.

Insert termination bits block 1004 creates a sequence of termination blocks by inserting a two termination bits for every 90 overhead frame bits. The termination block is the 92 bits in length, the same as a TFW. Each bit in a termination block is denoted T(i, r, s), where: i is the lane number; r is an index indicating block number and increments at the start of each block; and s is an index indicating the bit number within a termination block with a range 1 to 92. The first two bits of each termination block, T(i, r, 1) and T(i, r, 2) are populated with the output of a PRBS13 Generator R(i,v), where T(i, r, 1)=R(i,v) and T(i, r, 2)=R(i,v+1). The remaining 90 bits of each termination block, T(i, r, 3) to T(i, r, 92), are overhead frame bits, as discussed above. The frame bits are aligned with the termination blocks such that the first bit of an overhead bit, V(i, p, 1), corresponds to the third bit of a termination block, T(i, r, 3). Overhead frame bits are mapped to the termination blocks in order of location within the overhead frame, e.g., T(i, r, 4)=V(i, p, 2), T(i, r, 5)=V(i, p, 3), and so on. The termination bit PRBS13 generator is initialized during the training process. When training is complete the state of the termination bit PRBS13 generator is retained and the resulting output is used for the termination bits in the PMA frame.

The PMA sublayer next maps consecutive pairs of bits to one of four Gray-coded via Gray coding block 1006. Each pair of bits, {A, B}, of each termination block are converted to a Gray-coded symbol with one of the four Gray-coded levels as follows:

{0, 0} maps to 0,
{0, 1} maps to 1,
{1, 1} maps to 2, and
{1, 0} maps to 3.

Gray-coded symbols corresponding to each termination block are denoted G(i, r, t), where: i is the lane number; r is an index indicating the termination block number; and t is an index indicating the symbol number within a termination block with a range 1 to 46. Pairing of bits is such that the first two bits of each termination block, T(i, r, 1) and T(i, r, 2), form a pair. Each bit pair {T(i, r, 2t−1), T(i, r, 2t)} maps to {A, B} and the Gray-coded result is assigned to G(i, r, t). The gray-coded symbol G(i, r, 1) is formed from the first two bits of a termination block, the termination bits, thus forming a termination symbol.

Precoding of the Gray-coded symbols is next performed by [1/(1+D) mod 4] precoding block 1008. The precoder output symbols are denoted, P(i, r, t), where: i is the lane number; r is an index indicating the termination block number; and t is an index indicating the symbol number within a termination block with a range 1 to 46. For each Gray-coded symbol G(i, r, t), a precoded symbol, P(i, r, t) is determined by the following algorithm:

```
If t = 1 then
    P(i, r, t) = G(i, r, t)
Else
    P(i, r, ,t) = (G(i, r, t) − P(i, r, t−1)) mod 4
End If
```

The bits contributing to the Gray-coded termination symbol, G(i, r, 1), are the termination bits. The precoding algorithm applies this symbol directly to the output rather than combining it with the previous non-deterministic symbols and thus this termination symbol is always deterministic.

The last operation performed by PMA sublayer 906 is PAM4 encoding performed by PAM4 encoding block 1010. The PAM4 encoded symbols are denoted M(i, u), where i is the lane number and u is an index indicating the symbol number. Each consecutive precoder output symbol, P(i, r, t), is mapped to one of four PAM4 levels and assigned to the PAM4 encoder output M(i, u). Mapping from the precoder output symbol P(i, r, t) to a PAM4 encoded symbol M(i, u) is shown in FIG. 2 and discussed above.

Figure 11:
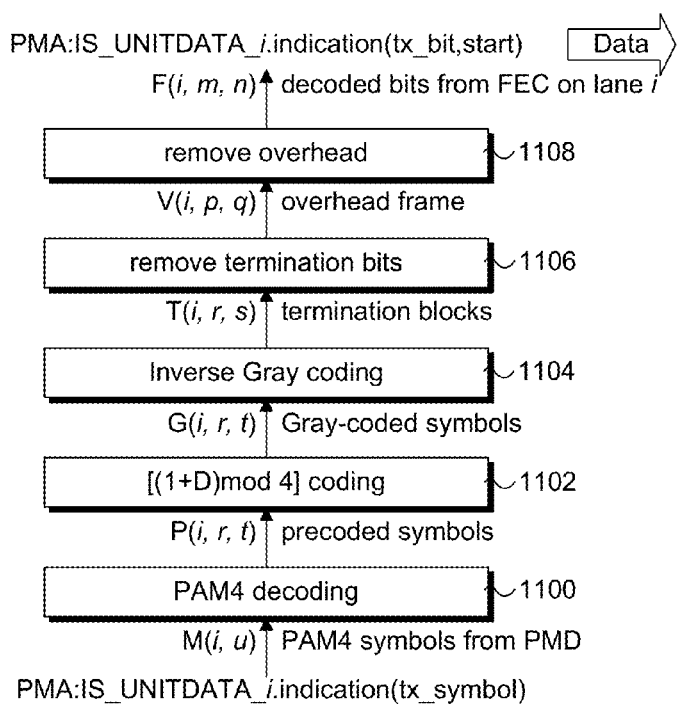
FIG. 11 is a receive adaption process diagram illustrating operations performed by the PMA sub-layer during link up receive operations.

In the received direction, the role of the 100GBASE-KP4 PMA is to adapt the PAM4 encoded signal from the PMD to a FEC encoded signal to be passed to the FEC for further processing. One embodiment of the adaptation processes are shown in FIG. 11 and include a PAM4 decoding block 1100, a [(1+D) mod 4] coding block 1102, an inverse Gray coding block 1104, a remove termination bits block 1106, and a remove overhead block 1108. In general terms, each of these blocks performs an inverse operation to a corresponding block in FIG. 10 described above. Accordingly, further details are not provided herein.

Figure 10A:
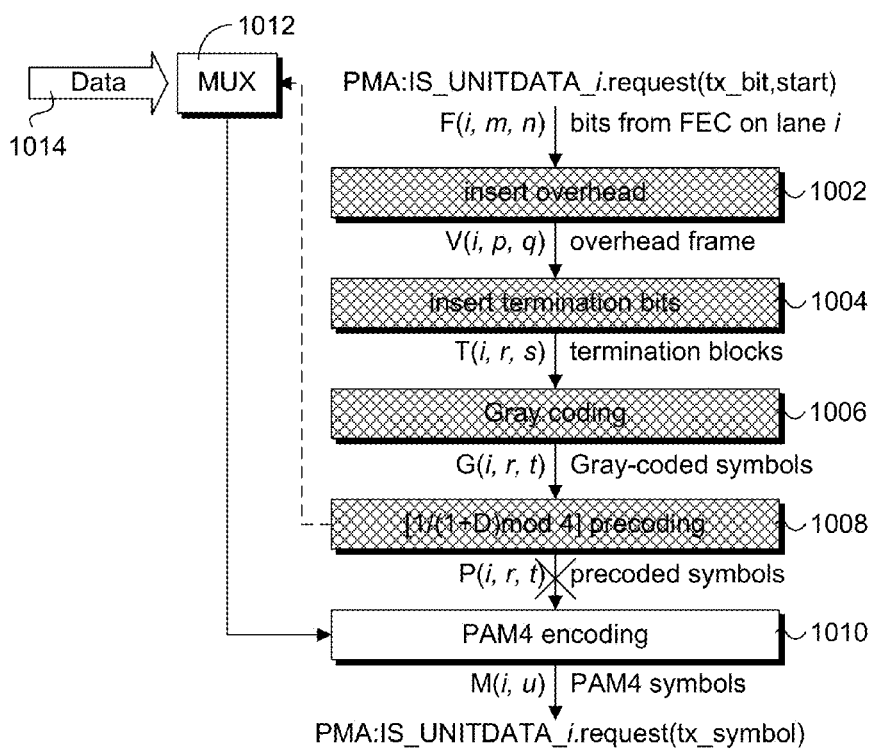
FIG. 10a is a transmit adaption process diagram illustrating operations performed by the PMA sublayer during transmission of the Frame Marker and Control Channel portions of an ALERT frame; according to one embodiment.

To simplify the link establishment process discussed above when TRANSMIT(TRAINING) as shown in FIG. 3, the PAM4 multi-level signaling is not used for the Frame Marker, Coefficient Update, and Status Report data. During the transmission of Frame Marker 402, Coefficient Update 404, and Status Report 406, the PAM4 transmitter bypasses the overhead frame, termination block, gray coding, and 1/(1+D) mod 4 precoding stages of the PMA transmit and receive functional specifications. This is illustrated in FIG. 10a, wherein data 1014 is redirected by a multiplexer (MUX) 1012 to PAM4 encoding block 1010, by passing each of insert overhead block 1002, insert termination bits block 1004, Gray coding block 1006, and [1/(1+D) mod 4] precoding block 1008. Therefore, the output levels are restricted to the −1 PAM4 symbol level for a logic 0 and the +1 PAM4 symbol level for a logic 1 to enable easy receiver lock to the training pattern over poor quality and non-equalized channels.

Figure 11A:
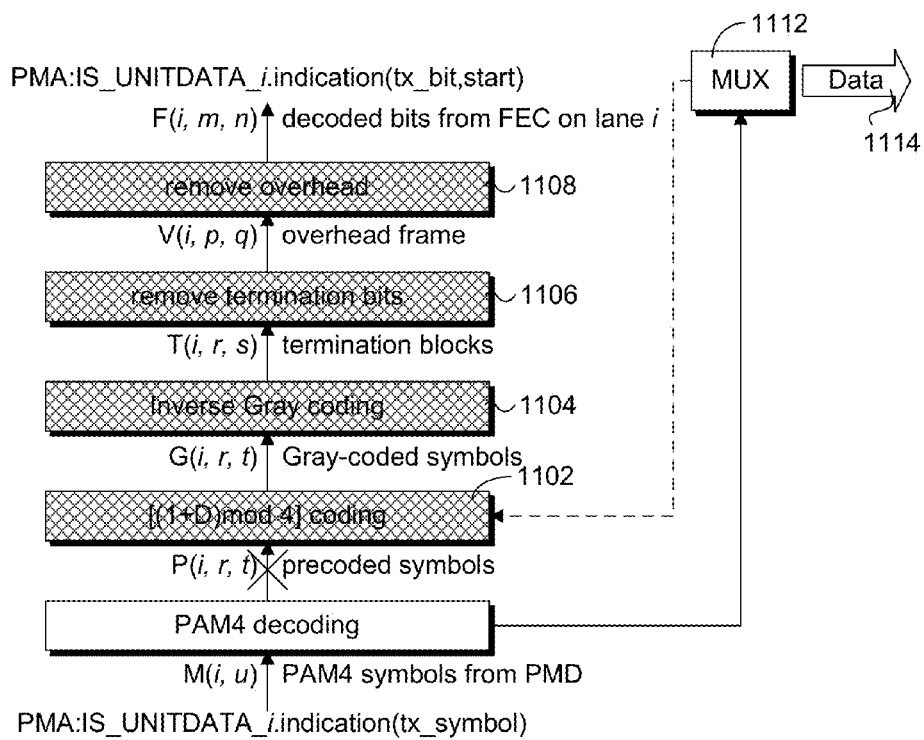
FIG. 11a is a receive adaption process diagram illustrating operations performed by the PMA sublayer during receiving of the Frame Marker and Control Channel portions of an ALERT frame; according to one embodiment.

The corresponding receiver operations for processing received data during transmission of Frame Marker 402, Coefficient Update 404, and Status Report 406 are shown in FIG. 11a. As illustrated, a MUX 1112 is configured to output data 1114 from PAM4 decoding block 1000, bypassing the operations of [(1+D) mod 4] coding block 1102, inverse Gray coding block 1104, remove termination bits block 1106, and remove overhead block 1108.

As discussed above, each TFW for the Coefficient Update 404 and Status Report 406 includes a 6 UI overhead field comprising 6 overhead bits. In one embodiment, the overhead bits are set to provide a DME logic value of '1', e.g., coded as 000111 or 111000. This may be used to preserve DC balance for the TFW.

In one embodiment, a parity scheme is implemented through use of Coefficient Update and Status Report fields. Under one implementation, cell 6 of the coefficient update field table of FIG. 7 and cell 19 of the status report field table of FIG. 8 are used to transmit parity bits, as opposed to transmitting all 0's defined for this cell by the 10GBASE-KR PHY specification. Two parity bits are calculated for each field (Coefficient Update and Status Report) separately, such that each field as a whole, including the parity bits, has even parity. The parity is the number of logical-one cells in the field, modulo 2 (not including the overhead bits). Under this parity scheme a parity check may be implemented to increase protection against false acceptance of sensitive messages, e.g., preset, init, and receiver ready. In one embodiment, if a parity violation is detected within the bounds of the respective field in a given training frame, the contents of that field within the control channel for that frame shall be ignored. For example, should only the parity of the coef update field be incorrect, then only the contents of the coef field will be ignored.

FIGS. 12a and 12b show respective examples of parity schemes, according to one embodiment. In FIG. 12a, a bit pattern of 0000000000 is used for the parity bits in cell 6. In FIG. 12b, a bit pattern of 1111100000 is used for the parity bits in cell 6.

Figure 10B:
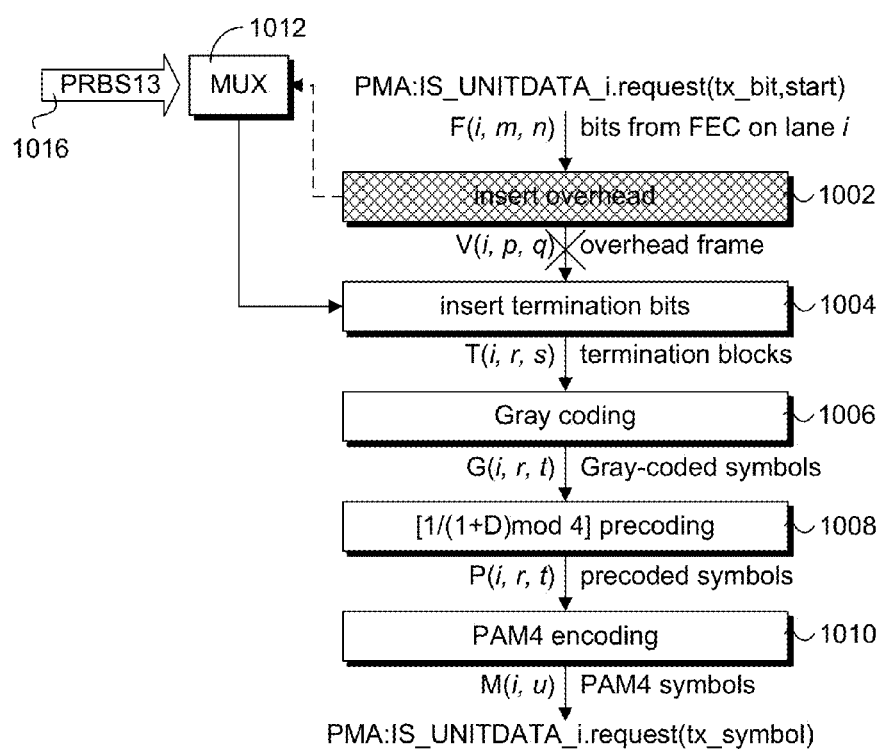
FIG. 10b is a transmit adaption process diagram illustrating operations performed by the PMA sublayer during transmission of the Training Pattern portion of an ALERT frame; according to one embodiment.
Figure 11B:
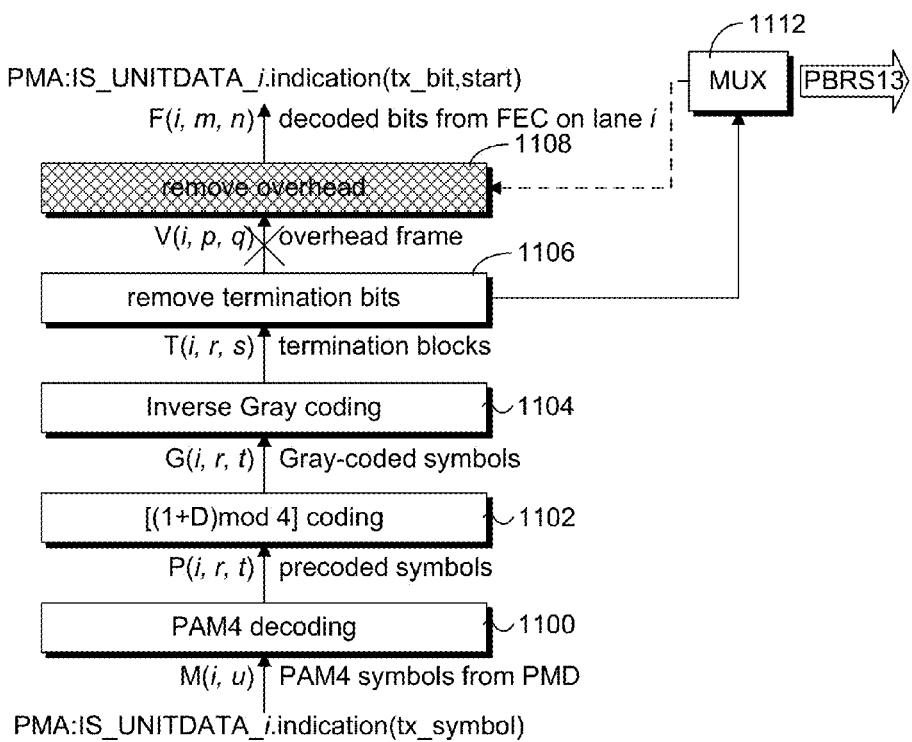
FIG. 11b is a receive adaption process diagram illustrating operations performed by the PMA sublayer during receiving of the Training Pattern portion of an ALERT frame; according to one embodiment.

In one embodiment, Training Pattern 408 uses the PMA transmit and receive functional specifications as currently defined in IEEE P802.3bj Draft 1.2 to enable the transmitter and receiver to exercise termination block, gray coding, and 1/(1+D) mod 4 precoding stages, while the overhead framer is bypassed. Corresponding block diagrams to facilitate the transmitter and receiver operations are shown in FIGS. 10b and 11b, respectively. Training Pattern 408 employs all four levels of PAM4 signaling to facilitate receiver calibration.

In one embodiment, input data 1016 to the termination block logic (i.e., insert termination bits block 1004 in FIG. 10b) comprises a 13-bit Pseudo Random Bit Sequence known as PRBS13. PRBS13 is a 8191 bit sequence derived from a Fibonacci LFSR with polynomial function, $$G(x)=1+x+x^2+x^{12}+x^{13}$$

Figure 4C:
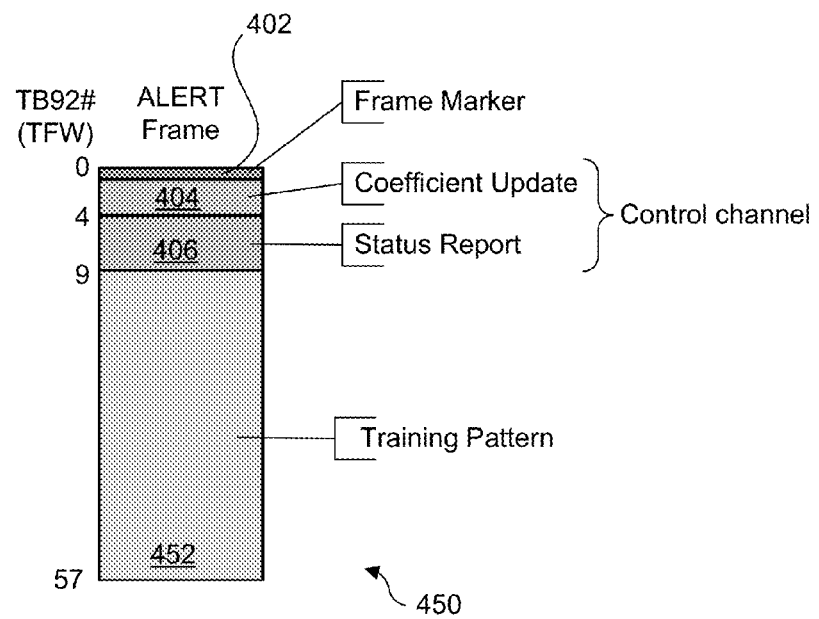
FIG. 4c is a diagram showing the components of an EEE ALERT frame, according to one embodiment.

In one embodiment, each TFW termination block in the training pattern comprises 92 bits of PRBS13, with the first two bits comprising termination bits. In one embodiment training pattern 408 comprises three full sequences (i.e., 8191 bits) of PRBS13 data plus a truncated PRBS 13 sequence of 6523 bits for a total of 31096 bits that are transmitted during the 338 TB92 blocks (338 TFWs) corresponding to Training Pattern 408, as shown in FIGS. 4b, 4c and 13. In one embodiment, the second PRBS13 sequence comprises a bit inversion of the first, as depicted by PRBS13a and PRBS13b in FIG. 4c, while the first and third PRBS13 sequences PRBS13a and PRBS13c are the same. In addition the truncated PRBS13 sequence is also an inverted portion of the first 6523 bits of PRBS13a.

Shortened Training Frames for EEE Wakeup

During training mode, data is transmitted from a transmitter in a component at the first end of a link to a receiver in a component at the opposing (second) end of the link. Concurrently, data is transmitted from a transmitter in the component at the second end of the link to a receiver in the component at the first end of the link. This is schematically illustrated in FIG. 1, and discussed above. The objective of the training mode is to perform synchronization and tuning between the ports at each end of the link to enable accurate data transfer during data mode. During the training mode, sufficient synchronization and tuning will be obtained to enable transition to data mode, that is, the normal operational mode (i.e., data mode) for the link during which data is transferred between the components at the opposing ends of the link.

An important aspect of bringing up the link involves facilitating the transition from training mode to data mode. A similar transition between operating modes is performed when transitioning a link from an LPI mode back to data mode. This transition includes a rapid EEE wake process.

Figure 14:
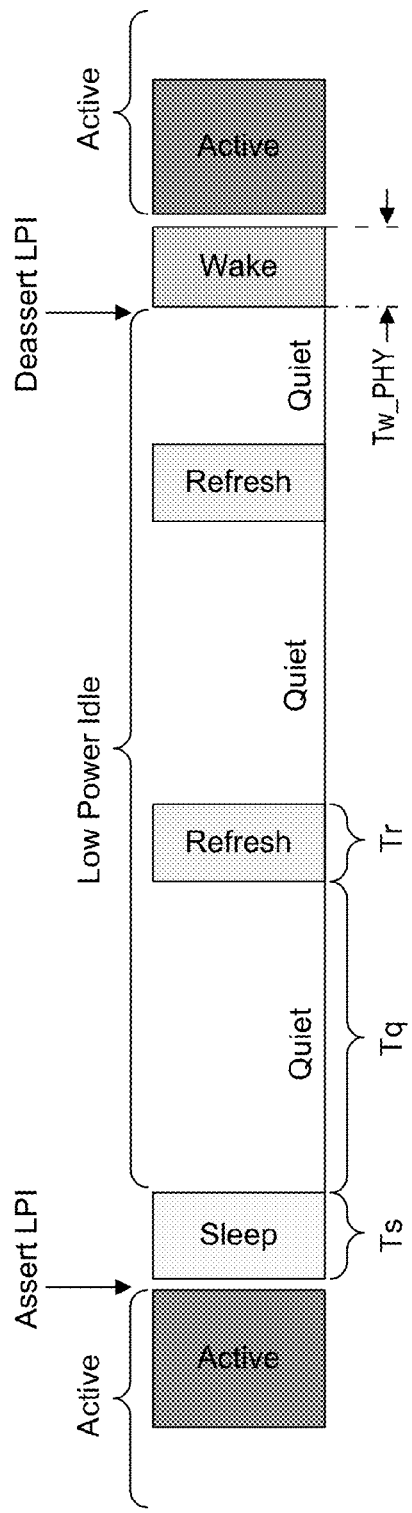
FIG. 14 is a timing diagram illustrating a first transition from an active data mode to an LPI mode and a second transition back to the active data mode that includes two EEE refresh periods and a EEE Wake period.

In further detail, FIG. 14 shows a timing diagram illustrating a first transition from an active data mode to an LPI mode and a second transition back to the active data mode. During the data mode, data is exchanged between the components at the opposing ends of the links, and the link state is deemed "Active." Data mode does not require a constant transfer of data, but rather may include periods of data transfer and idle periods during which no data is transferred.

Upon detection of an extended idle period or for other reasons, an active link state may be transitioned to a low-power state corresponding to the LPI mode. To enter LPI mode, an LPI signal is asserted, causing the link to transition from the active data mode to a sleep state, which has a length Ts. The link state will then operate in a quiet state having a period of Tq periodically interspersed with brief refresh states having a period of Tr. (It is noted that the length of period Tr relative to the length of period Tq in FIG. 14 is exaggerated for clarity.)

Transition from LPI mode back to data mode is invoked through use of a deassert LPI signal. In response, the link transitions from the LPI mode back to an active state during an EEE wake period. This is followed by a return to the active data mode. In one embodiment, the time to wake up and transition to data mode (Tw_PHY) is targeted for 5 µs for a 100 Gbps PHY.

Figure 15:
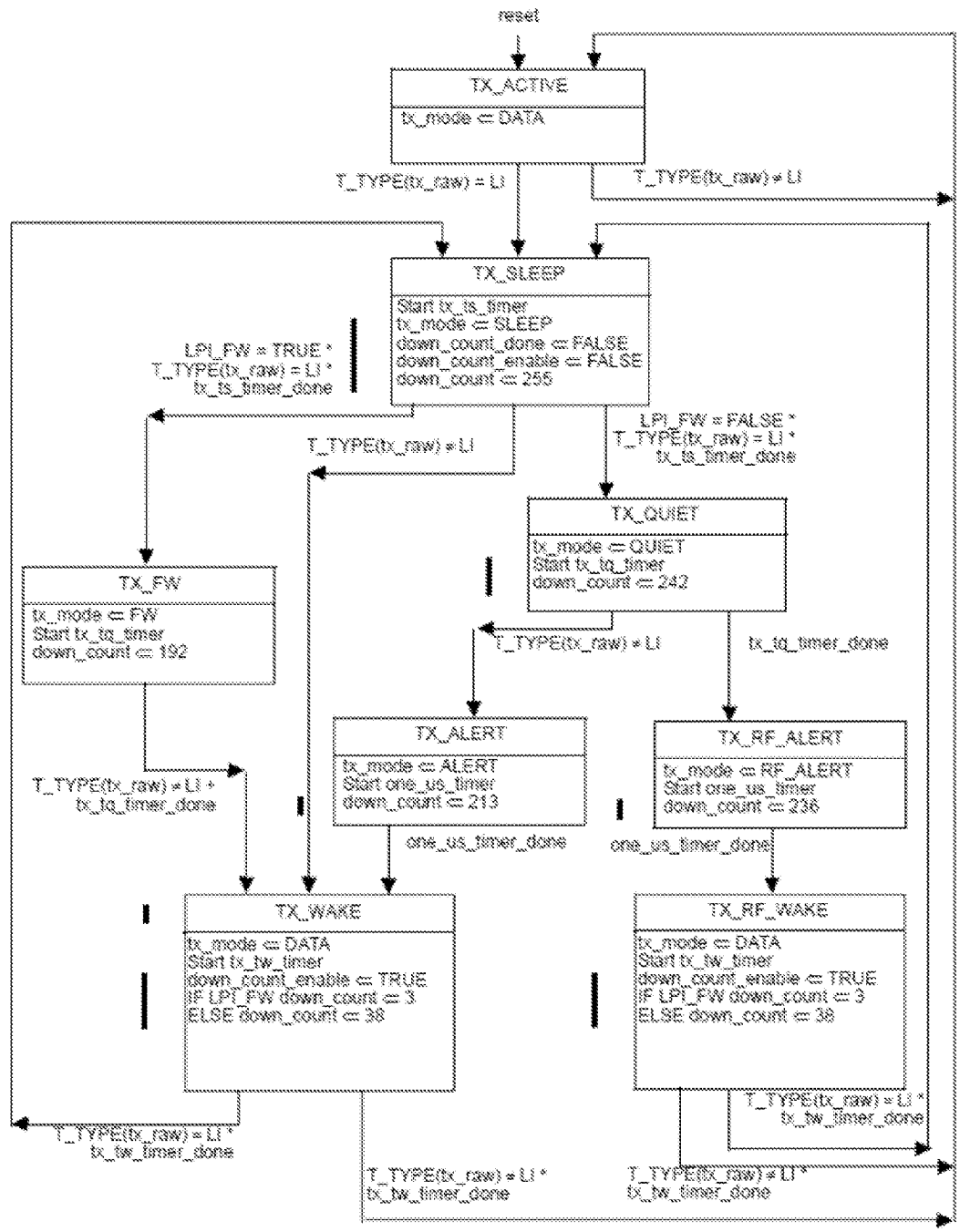
FIG. 15 depicts an LPI transmit state machine diagram, according to one embodiment

FIG. 15 depicts an LPI transmit state machine diagram, according to one embodiment. When transitioning from the QUIET state (TX_QUIET) toward either WAKE (TX_WAKE) or REFRESH (TX_RF_WAKE) an ALERT signal is transmitted. The ALERT signal provides: 1) a strong signal to detect and initiate wake up; 2) a frame alignment signal for fast alignment to training frame and line coding; and 3) a control channel to indicate the EEE state and to handoff from an ALERT frame to a PMA frame.

During data mode, data is exchanged between components using PMA frames. Under one embodiment, a PMA frame having a length of 348 TB92 words (348 TFW) is used. In view of this length, in one embodiment an ALERT frame is used during EEE wakeup that has a size that is equal to 348 TB92/n, where n>1. In one embodiment, n=6, and thus the length of the ALERT frame is 348/6=58 TB92 (58 TFW).

Figure 4D:
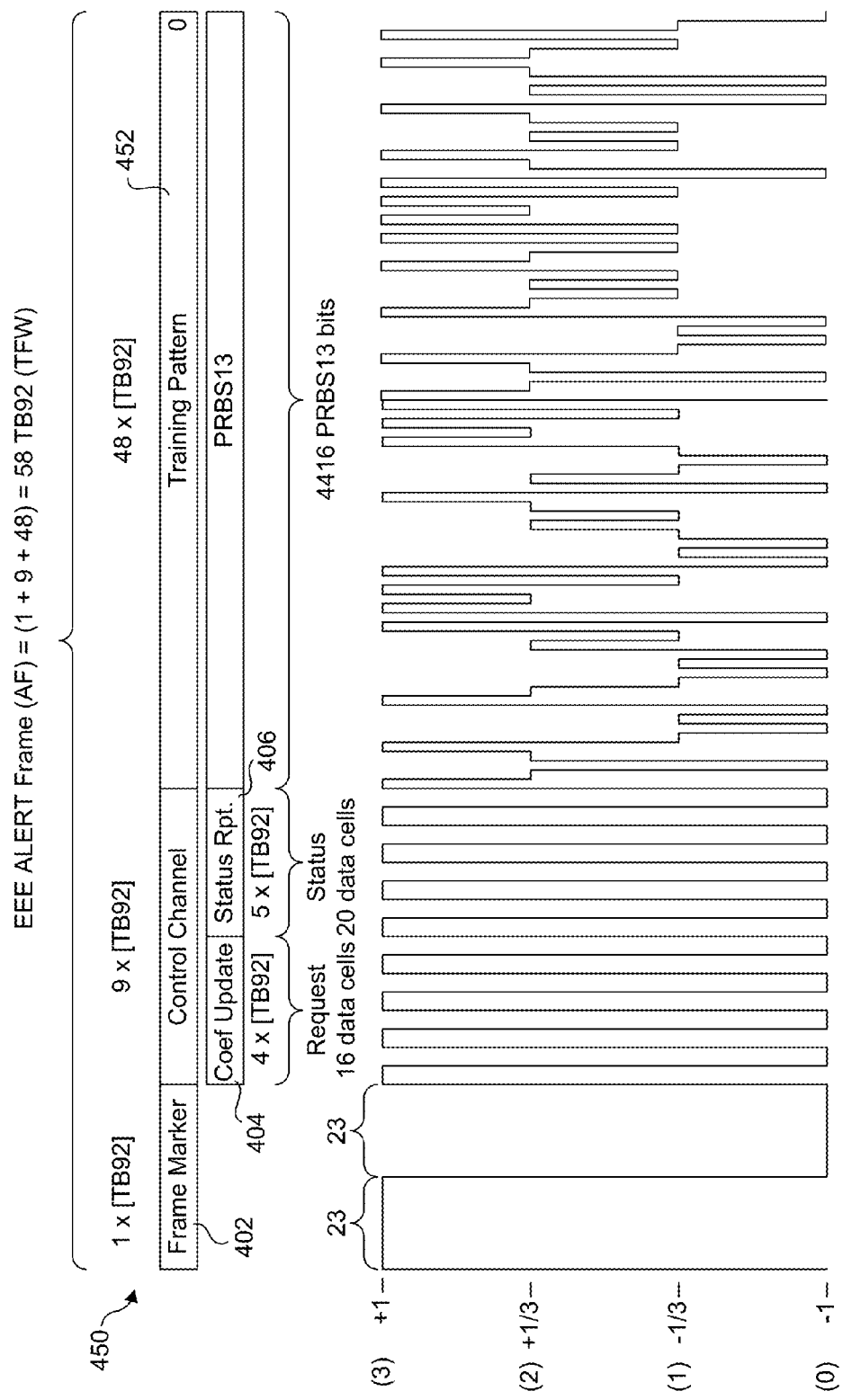
FIG. 4d is a diagram illustrating an ALERT frame and exemplary signaling, according to one embodiment.

An exemplary ALERT frame 450 having a length of 58 TB92 words is shown in FIGS. 4c and 4d. The first portion of ALERT frame 450 shares the same configuration as training frame 400 of FIGS. 4a and 4b and includes a frame marker 402 and a control channel comprising a coefficient update 404 and a status report 406. The remaining portion of training frame 450 comprises a training pattern 452 having a length of 48 TB92. In one embodiment, training pattern 452 comprises the first 4416 bits of a PRBS 13 bit pattern.

As discussed above, the length of a PMA frame is 348 TFW, while in one embodiment the length of an ALERT frame is 58 TFW. When coming out of LPI mode, the operational mode of the link is returned to data mode, such as shown in FIG. 14. In order to transition back to data mode, the PMA framing logic needs to determine the offset of the frame when this transition occurs. In one embodiment, an alignment data variable called a pma_align_offset (PAO) is employed to indicate the relative location of the next ALERT frame relative to the PMA frame. When using a 58 TFW length, the PAO is configured to be aligned with one of six valid offsets from the PMA frame, wherein:

0: marker aligned with 40-bit overhead (i.e., start of PMA frame)
1: marker is at offset by 58 words from 40-bit overhead
2: marker is at offset by 116 words from 40-bit overhead
3: marker is at offset by 174 words from 40-bit overhead
4: marker is at offset by 232 words from 40-bit overhead
5: marker is at offset by 290 words from 40-bit overhead In one embodiment, the PAO comprises a 5-bit value that is stored in cells 11:7 of the Status Report, as shown in FIG. 8. The reason for the use of a 5-bit value is in one embodiment the PAO is also used for aligning training frames relative to PMA frames using a scheme employing PAO values ranging from 0-28, and thus requiring at least 5-bits. In another embodiment employing PMA-sized training frames, the PAO value for aligning training frames is not employed, and thus the PAO may comprise a 3-bit value.

Figure 16:
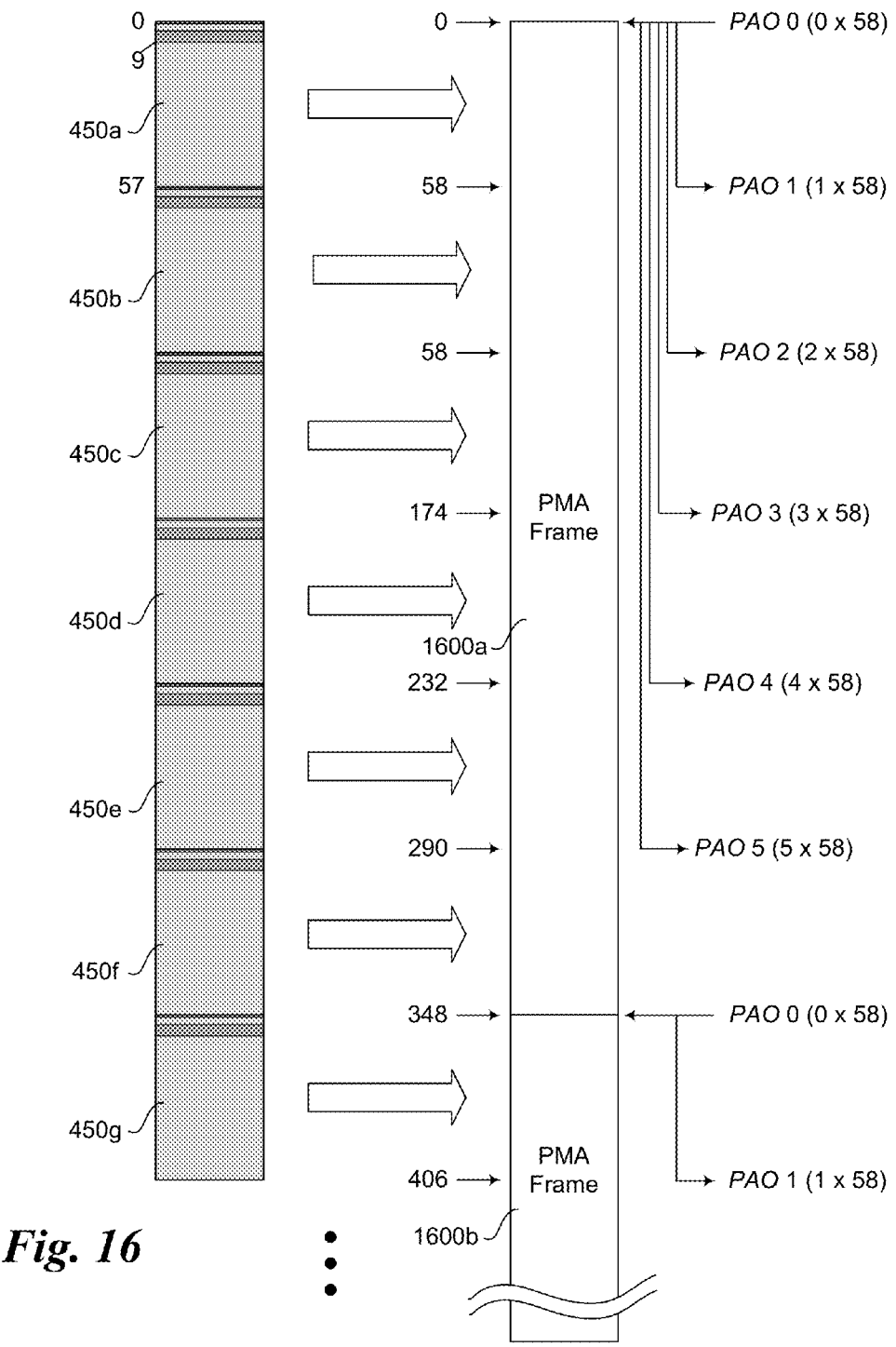
FIG. 16 illustrates a plurality of ALERT frames and their alignment relative to PMA frames, along with a resulting advancement in the alignment offset between ALERT frames and PMA frames of 1 (mod 6)

During the Refresh and Wake periods depicted in FIG. 14), ALERT frames are transmitted sequentially, as shown in FIG. 16. During the Refresh and Wake periods, the ALERT frames are not sent within PMA frames; however, the PMA framing logic and data paths are used to make and process the ALERT frames.

In one embodiment, ALERT frames are transmitted with an offset of 58*PAO, PAO ∈ {0 . . . 5} TB92 blocks relative to the 40-bit overhead employed at the beginning of each PMA frame. This results in the offset being periodical with a cycle of 348/58=6 ALERT frames. Under these parameters, the equation for PAO is, PAO=mod(58*n,6)/(348/6) or simply (mod n+6,6)

wherein n is the ALERT frame sequence number.
This equation is derived from the generalized equation for k, PAO=mod($l_{tf}$*n,m)/($l_{pma}$/m)

wherein $l_{tf}$ is the length of the ALERT frame, $l_{pma}$ is the length of the PMA frame, m is the number of ALERT frames in the offset cycle, and n is the ALERT frame sequence number.

An illustration of one exemplary implementation following this scheme is shown in FIG. 16, wherein seven ALERT frames 450a-g are transmitted back-to-back so as to be offset relative to the start of PMA frames 1600a, and 1600b. In this example, the first ALERT frame 450a is transmitted so that it is aligned with the beginning of the first PMA frame 1600a, such that the offset between the beginning of the ALERT frame and the beginning of the PMA frame is 0, and k=0. Under this initial condition (i.e., PAO=0), the next ALERT frame will have an offset of 58 (PAO=1), following by 116 (PAO=2), 174 (PAO=3), and 232 (PAO=4), etc.

Figure 17:
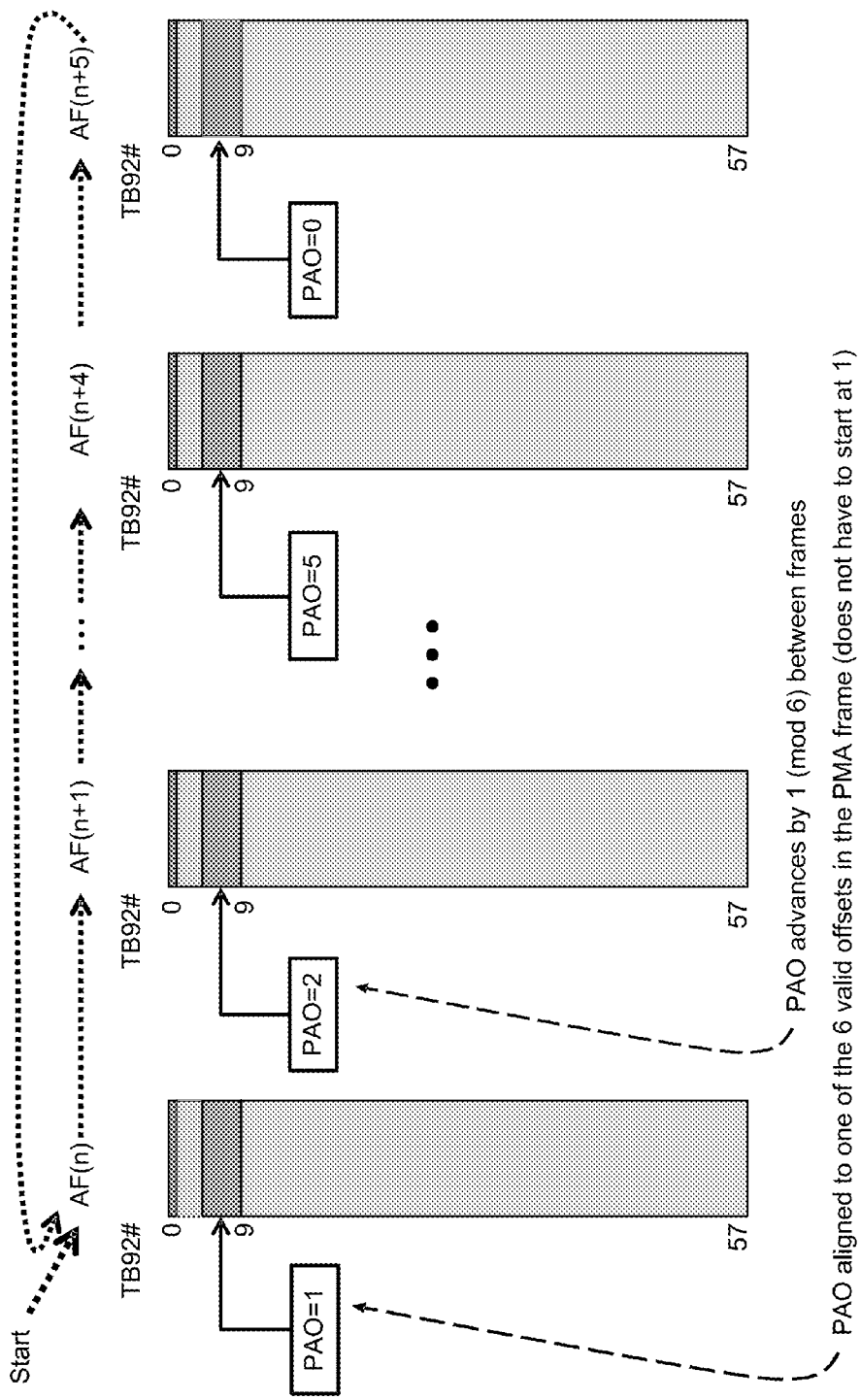
FIG. 17 illustrates an ALERT frame cycle employing 6 ALERT frames per cycle and corresponding PMA alignment offset advancements between ALERT frames of 1 (mod 6)

An illustration of an ALERT frame cycle of 6 ALERT frames along with corresponding PAO markers are shown in FIG. 17. In this example, ALERT frame 1 (AF(n)) includes a PAO value of 1, which is multiplied by 58 to indicate the relative location of the next ALERT frame (AF(n+1)) within the PMA framing logic. As illustrated, the next PAO value for (AF(n+2)) is 2, with the PAO value advancing by 1 between ALERT frames until it is returned to 0 after reaching 5. This is depicted by the PAO values for the last two ALERT frames in the cycle sequence, which are 5 and 0, which returns the cycle back to the starting alignment (which in this example indicates the beginning of the ALERT frame is aligned with the 40-bit overhead of the PMA frame).

In one embodiment, PMA alignment offset data are used in combination with a countdown value to facilitate the transition from ALERT mode to data mode. The use of the countdown value provides an indication to the receiving side that the transition will occur in j, j–1 . . . 1, 0 ALERT frames, wherein a corresponding ALERT_frame_countdown variable is employed to indicate the number of ALERT frames remaining to be sent prior to data mode operation.

Returning to FIG. 8, the status field cells include three cells that are used for facilitating a rapid transition from ALERT mode to data mode, which operate as follows. Upon detecting that sufficient synchronization and tuning has been establish on a link from a transmitter of a first component to a receiver of a second component, the transmitter of the second component returns a value of 1 in cell 6 of the status field to the receiver of the first component to indicate the local receiver has determined the training is complete and is prepared to receive data. A 5-bit pma_align_offset value is also returned in the status field via data in cells 11:7 (having a value of PAO=1(mod6), as discussed above), along with a 2-bit ALERT_frame_countdown value in cells 13:12, facilitating a countdown sequence of 3, 2, 1, 0.

With reference to FIG. 7, during the refresh and wake periods, the coefficient update field cells are transmitted as 0's. Similarly, the cells 5:0 of the status report field (FIG. 8) are transmitted as 0, and ignored on reception. Cell 6 is set to 1, since training has been completed. The parity check is calculated in the same manner as for a training frame.

The EEE mode and state is specified by Cells 18:14 in the status report field of FIG. 8. Cell 18 indicates the mode, where a 0 indicates the link is in start-up training mode and a 1 indicates the link is in LPI mode. If Cell 18=1b, Cells 17:16 indicate the EEE state, where 00=Wake, 01=Refresh, with 10 and 11 reserved. Cells 13:12 are used for the countdown timer, as discussed above.

In one embodiment, the ALERT pattern initial states for lanes 0-3 are defined in the following manner. Preferably, the initial four states are chosen such that the four resulting PAM4 sequences have low autocorrelation (except at offset 0) and low cross-correlation between each pair, as illustrated in FIGS. 18a and 18b. An exemplary set of initial states meeting the foregoing conditions include (initial bits sent on the data path, LSB first): PMD lane 0: 0xCD92, PMD lane 1: 0x2AFB, PMD lane 2: 0xC3D3, PMD lane 3: 0xE2F6. In one embodiment the generator is re-seeded to the same values at the beginning of each ALERT frame.

An example of PRBS, gray code, and precoder data sequences employing the foregoing initial states are shown in FIG. 18b. For each physical lane i=0 . . . 3, the training sequence shall start from state Si. This will also uniquely identify the lanes if they are swapped, and save lane order identification later on.

Exemplary Implementation Environment and Blade Server Architecture

It is envisioned that aspects of the embodiments herein may be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into LANs with appropriate switching and routing facilities between the LANs to form a private Intranet. For example, cloud hosting facilities may typically employ large data centers with a multitude of servers.

As an overview, typical blade server components and systems are shown in FIGS. 19a-c, and 20. Under a typical configuration, a rack-mounted chassis 1900 is employed to provide power and communication functions for a plurality of server blades (i.e., blades) 1902, each of which occupies a corresponding slot. (It is noted that all slots in a chassis do not need to be occupied.) In turn, one or more chassis 1900 may be installed in a blade server rack 1903 shown in FIG. 19c. Each blade is coupled to an interface plane 1904 (i.e., a backplane or mid-plane) upon installation via one or more mating connectors. Typically, the interface plane will include a plurality of respective mating connectors that provide power and communication signals to the blades. Under current practices, many interface planes provide "hot-swapping" functionality—that is, blades can be added or removed ("hot-swapped") on the fly, without taking the entire chassis down through appropriate power and data signal buffering.

Figure 19A:
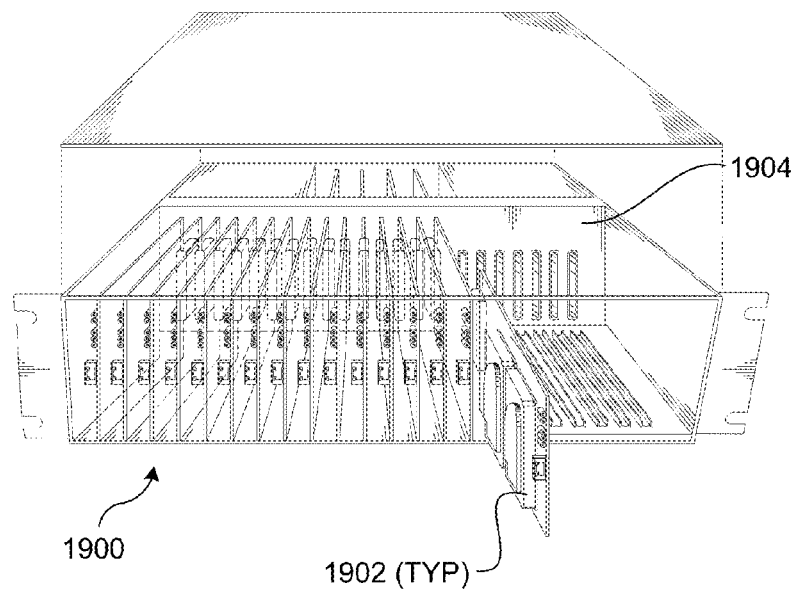
FIG. 19a is a frontal isometric view of an exemplary blade server chassis in which a plurality of server blades are installed.
Figure 19B:
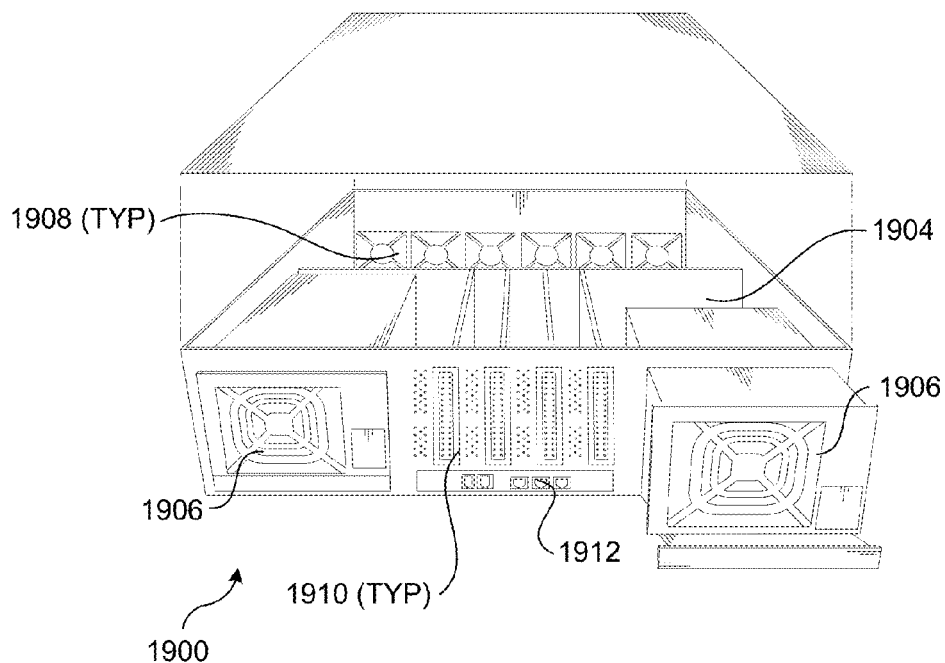
Figure 19C:
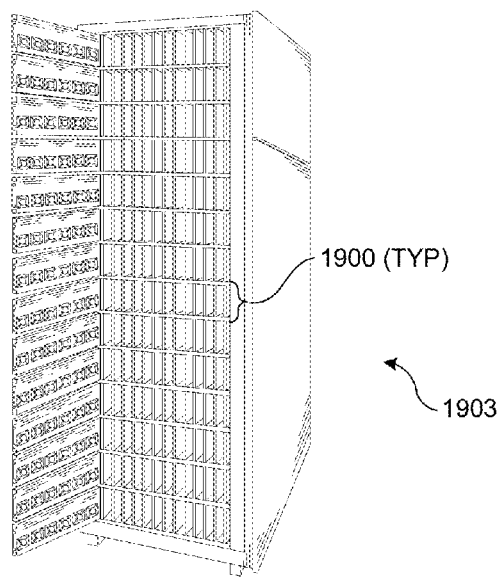
FIG. 19c is an isometric frontal view of an exemplary blade server rack in which a plurality of rack-mounted blade server chassis corresponding to FIGS. 16a and 16b are installed.

A typical mid-plane interface plane configuration is shown in FIGS. 19a and 19b. The backside of interface plane 1904 is coupled to one or more power supplies 1906. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 1908 are employed to draw air through the chassis to cool the server blades.

An important feature required of all blade servers is the ability to communicate externally with other IT infrastructure. This is typically facilitated via one or more network connect cards 1910, each of which is coupled to interface plane 1904. Generally, a network connect card may include a physical interface comprising a plurality of network port connections (e.g., RJ-45 ports), or may comprise a high-density connector designed to directly connect to a network device, such as a network switch, hub, or router.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 1912 that is coupled to the backside or frontside of the interface plane. As yet another option, a management or configuration server may be employed to manage blade activities, wherein communications are handled via standard computer networking infrastructure, for example, Ethernet.

Figure 20:
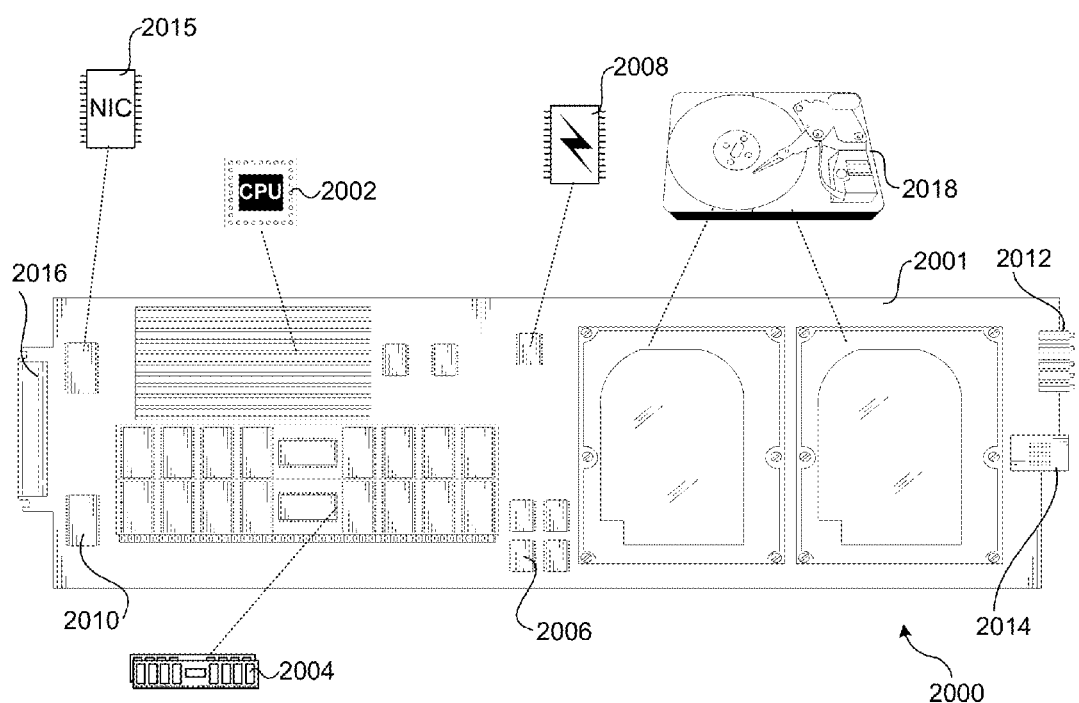
FIG. 20 shows details of the components of a typical server blade, according to one embodiment.

With reference to FIG. 20, further details of an exemplary blade 2000 are shown. As discussed above, each blade comprises a separate computing platform that is configured to perform server-type functions, i.e., is a "server on a card." Accordingly, each blade includes components common to conventional servers, including a main printed circuit board (main board) 2001 providing internal wiring (i.e., buses) for coupling appropriate integrated circuits (ICs) and other components mounted to the board. These components include one or more processors 2002 coupled to system memory 2004 (e.g., some form of Random Access Memory (RAM)), cache memory 2006 (e.g., SDRAM), and a firmware storage device 2008 (e.g., flash memory). A NIC (network interface controller) chip 2010 is provided for supporting conventional network communication functions, such as to support communication between a blade and external network infrastructure. Other illustrated components include status LED (light-emitting diodes) 2012, a set of RJ-45 console ports 2014 (only one of which is shown for simplicity), and a NIC 2015 coupled to an interface plane connector 2016. Additional components include various passive components (i.e., resistors, capacitors), power conditioning components, and peripheral device connectors.

Generally, each blade 2000 may also provide on-board storage. This is typically facilitated via one or more built-in disk controllers and corresponding connectors to which one or more disk drives 2018 are coupled. For example, typical disk controllers include SATA controllers, SCSI controllers, and the like. As an option, the disk drives may be housed separate from the blades in the same or a separate rack, such as might be the case when a network-attached storage (NAS) appliance or backend storage sub-system that is employed for storing large volumes of data.

NIC 2010 comprises circuitry and logic for facilitating corresponding networking operations, such as support for physical layer (L1) and data link layer operations (L2). Typically, upper layer operations are facilitated by an operating system network stack that would be hosted by an operating system running on processor 2002. However, in some embodiments, a NIC may employ its own network stack via embedded logic or the like.

In a typical data center deployment, network switching elements comprise rack-mounted equipment, such as would occupy a 1U, 2U, or 4U slot, or may be implemented via one or more server blades. Optionally, a network switching element may be implemented use one or more server blades.

NIC 2015 comprises circuitry and logic for implementing high-speed communication between multiple blades 2000 via interface plane 1904. In one embodiment, NIC 2015 is configured to implement signaling and logic corresponding to the 100Gbps embodiments disclosed herein, including circuitry and logic for implementing a 100GBASE-KP4 port and associated link training operations. To further facilitate inter-blade communication over the 100GBASE-KP4 PHY, interface plane 1904 includes appropriate connectors, circuitry and wiring for facilitating the physical media aspect of the PHY (wiring not shown). For example, the circuitry may comprise connectors and wiring for facilitating signaling over 8 differential pairs in accordance with the configuration shown in FIG. 1.

In general, aspects of the EEE wakeup embodiments disclosed herein may be implemented hardware (via, e.g., embedded logic), or via a combination of hardware and software. For example, a network element may include a processor running a software-based network stack and associated logic implemented via software for performing aspects of the operations described herein. Optionally, similar logic could be implemented via embedded logic in a NIC, large-scale network interface, or the like.

In addition to implementation in a blade server, the principles and teachings herein may be implemented via other types of equipment, such as telecommunications routers and switches. For example, a typical telecom switch comprises a rack with multiple cards coupled to a backplane, wherein the cards are generally analogous to the blades and the backplane is analogous to the interface plane in a blade server. Accordingly, the cards would be configured with circuitry and logic for implemented 100GBASE-KP4 ports, and the backplane would include connectors, circuitry, and wiring for facilitating the physical media aspect of the 100GBASE-KP4 PHY.

Figure 21:
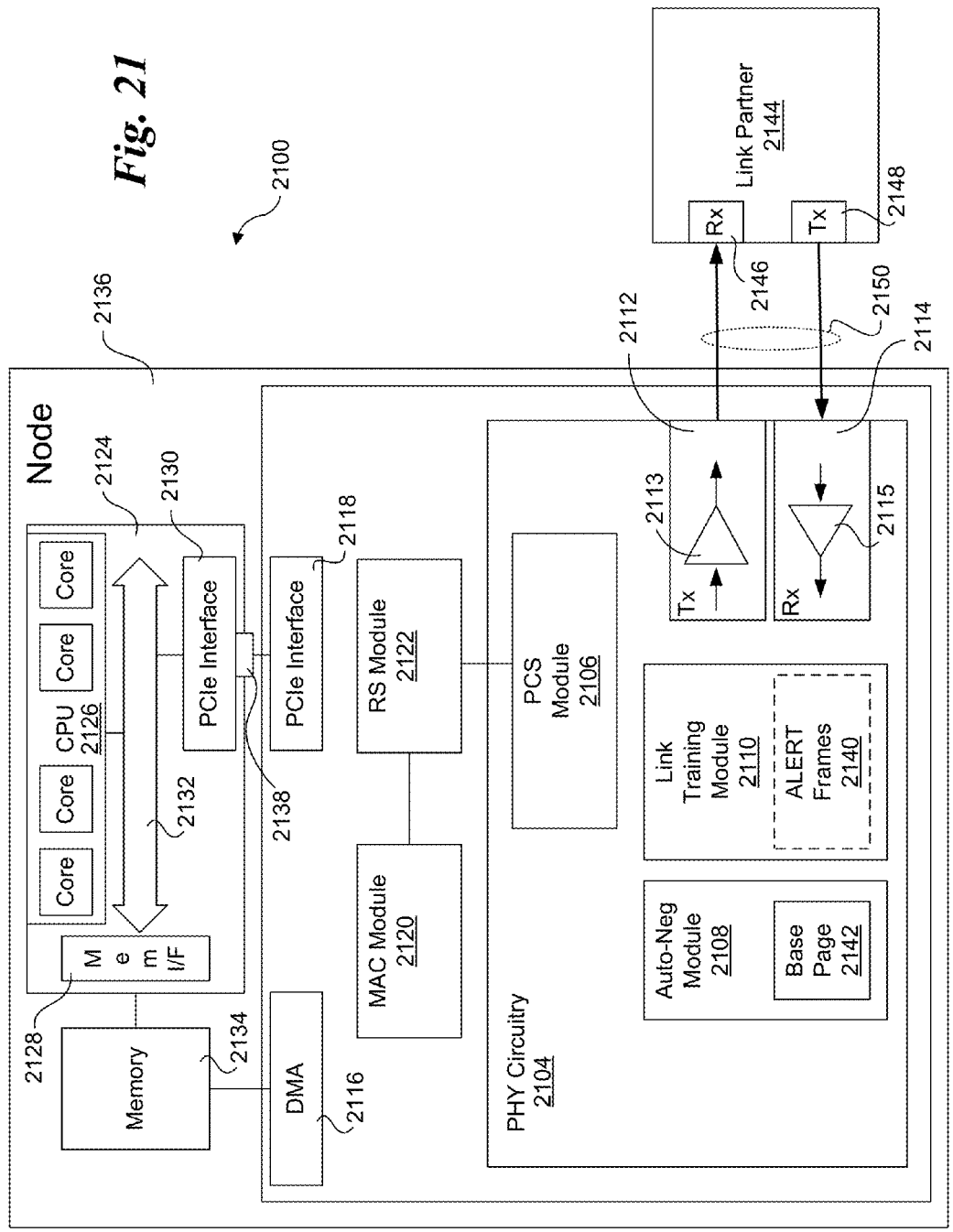
FIG. 21 is a schematic diagram illustrating an architecture for a network node employing a network chip configured to perform EEE wake and refresh operations in accordance with the embodiments disclosed herein.

FIG. 21 shows an architecture 2100 for a network node employing a network chip 2102 configured to perform EEE wakeup operations in accordance with aspects of the embodiments disclosed herein. Network chip 2102 comprises PHY circuitry 2104 including a PCS module 2106, an auto-negotiation module 2108, a link training module 2110, a transmitter port 2112 including transmitter circuitry 2113 and a receiver port 2114 including receiver circuitry 2115. Network chip 2102 further includes a DMA (Direct Memory Access) interface 2116, a Peripheral Component Interconnect Express (PCIe) interface 2118, a MAC module 2120 and a Reconciliation Sublayer (RS) module 2122. Network node 2100 also comprises a System on a Chip (SoC) 2124 including a Central Processing Unit (CPU) 2126 having one or more processor cores, coupled to a memory interface 2128 and a PCIe interface 2130 via an interconnect 2132. Memory interface 2128 is further depicted as being coupled to memory 2134. Under a typical configuration, network chip 2102, SoC 2124 and memory 2134 will be mounted on or otherwise operatively coupled to a circuit board 2136 that includes wiring traces for coupling these components in communication, as depicted by single lines connecting DMA 2116 to memory 2134 and PCIe interface 2118 to PCIe interface 2130 at a PCIe port 2138.

In one embodiment, MAC module 2120 is configured to implement aspects of the MAC layer operations performed by embodiments described herein. Similar, RS module 2122 is configured to implement reconciliation sub-layer operations performed by embodiments described herein, such as illustrated in FIG. 9*a*.

Link training module 2110 is further depicted as including ALERT frames 2140, which are configured in accordance with the ALERT frame embodiments disclosed herein. Auto-negotiation module 2108 is further depicted as including a base page 2142. During link initialization, auto-negotiation module 2108 is implemented for auto-negotiation of link speed and capabilities. The auto-negotiation format consists of a base-page (e.g., base page 2142), which is the first set of formatted information exchanged with the link partner, as depicted by a link partner 2144 including a receiver port 2146 and a transmitter port 2148. In one embodiment the configuration of node 2100 and link partner 2144 are similar. In one embodiment, the format of base page 2142 is in accordance with the base page format defined in IEEE 802.3bh Draft 3.1. Link training module 2110 is further configured to perform link training operations relating to initialization for a link 2150 communicatively coupled between network chip 2102 and link partner 2144 in accordance with aspects of the embodiments disclosed herein.

In one embodiment, network chip 2102 comprises a 100 Gbps Ethernet Network Interface Controller (NIC) chip. However, the circuitry and components of network chip 2102 may also be implemented in other types of chips and components, including SoCs, multi-chip modules, and NIC chips including support for multiple network interfaces (e.g., wired and wireless).

In addition, embodiments of the present description may be implemented not only within a semiconductor chip such as a NIC, but also within non-transient machine-readable media. For example, the designs described above may be stored upon and/or embedded within non-transient machine readable media associated with a design tool used for designing semiconductor devices. Examples include a netlist formatted in the VHSIC Hardware Description Language (VHDL) language, Verilog language or SPICE language, or other Hardware Description Language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for facilitating a transition from a low power mode and a data mode for a high-speed Ethernet link, comprising:
    in response to signal initiating a transition from the low power mode to the data mode,
    transmitting ALERT frames from a transmitter port of a first component at a first end of the link to be received at a receiver port of a second component at an opposing end of the link, the ALERT frames having a first length and being transmitted using Physical Media Attachment (PMA) framing logic employing frames having a second length different than the first length;
    receiving ALERT frames transmitted from a transmitter port of the second component at a receiving port of the first component, the ALERT frames that are received including frame alignment offset data identifying a relative offset between a start of an ALERT frame and a predetermined location in a PMA frame, and countdown data; and
    employing the frame alignment offset data and the countdown data to facilitate the transition from the low power mode and the data mode.

2. The method of claim 1, wherein a current ALERT frame that is received includes data identifying a relative offset between the start of a following ALERT frame and the predetermined location in the PMA frame.

3. The method of claim 2, wherein the predetermined location in the PMA frame is a 40-bit overhead for the PMA frame.

4. The method of claim 1, wherein an ALERT frame has a first length and a PMA frame has a second length comprising an integer multiple of the length of the ALERT frame.

5. The method of claim 1, wherein the ALERT frame comprises a plurality of 92-bit terminated blocks (TB92), and the ALERT frame has a length of 58 TB92.

6. The method of claim 1, wherein an ALERT frame comprises a frame marker portion, a control channel portion, and a training pattern portion, and wherein the frame alignment offset data and the countdown data are included in the control channel portion of the ALERT frame.

7. The method of claim 6, wherein the control channel portion of the ALERT frame includes a coefficient update portion and a status report portion including cells in which the frame alignment offset data and the countdown data are stored.

8. The method of claim 7, wherein each of the coefficient update portion and status report portion include data that is encoded using differential Manchester encoding (DME), and further wherein each of the control channel portion and status report portion include overhead bits that are selected to effect DC balance.

9. The method of claim 1, wherein the ALERT frame includes a training pattern, the method further comprising employing a 13-bit Pseudo-Random Bit Sequence (PRBS13) bit pattern for at least a portion of the training pattern.

10. The method of claim 1, wherein the low power mode comprises a Low Power Idle (LPI) mode, and wherein the signal initiating a transition from the low power mode to the data mode comprises a Deassert LPI signal.

11. The method of claim 1, wherein the Ethernet link comprises a multi-lane link including multiple lanes, further comprising transmitting ALERT frames over each of multiple lanes.

12. The method of claim 1, wherein the Ethernet link comprises a physical media implemented via wiring in one of a mid-plane or back-plane.

13. The method of claim 1, wherein the high-speed Ethernet link supports a bandwidth of 100 Gigabits per second.

14. An apparatus including a high-speed Ethernet interface having a transmitter and a receiver, the apparatus configured to perform operations when the apparatus is operating comprising:
operating the transmitter in a low power idle (LPI) mode; and
transmitting a sequence of ALERT frames from the transmitter to be received at a receiver of a high-speed Ethernet interface of a second apparatus, the ALERT frames having a first length and being transmitted within Physical Media Attachment (PMA) frames having a second length, each ALERT frame including frame alignment offset data identifying a relative location of a next ALERT frame within a PMA frame and an Alert frame countdown value indicating one of a predetermined value or a number of ALERT frames remaining before transition to a data mode.

15. The apparatus of claim 14, wherein the apparatus is configured to perform further operations when operating comprising:
transitioning from the LPI mode to the data mode by transmitting a PMA data frame immediately following an ALERT frame having an Alert frame countdown value of 0.

16. The apparatus of claim 14, wherein the apparatus is configured to perform operations when operating comprising:
receiving a de-assert LPI signal; and [not—this might actually be an enunciation of a de-assert signal that is sent to the link partner on the other side of the link]
transmitting the sequence of ALERT frames in response to receiving the LPI de-assert signal.

17. The apparatus of claim 14, wherein an ALERT frame has a first length and a PMA frame has a second length comprising an integer multiple of the length of the ALERT frame.

18. The apparatus of claim 14, wherein the ALERT frame comprises a plurality of 92-bit terminated blocks (TB92), and the ALERT frame has a length of 58 TB92.

19. The apparatus of claim 14, wherein a current ALERT frame that is received includes data identifying a relative offset between the start of a following ALERT frame and the predetermined location in the PMA frame.

20. The apparatus of claim 14, wherein the high-speed Ethernet transmitter port is configured to implement a multi-lane link including multiple lanes, and the Ethernet transmitter port is further configured to transmit ALERT frames over each of multiple lanes.

21. The apparatus of claim 14, wherein the high-speed Ethernet transmitter port supports a bandwidth of 100 Gigabits per second.

22. The apparatus of claim 14, further comprising a high-speed Ethernet receive port configured to receive ALERT frames from the second apparatus.

23. An apparatus, comprising:
Physical Layer (PHY) circuitry, including,
a Physical Coding Sublayer (PCS) module;
an auto-negotiation module;
a link training module;
a transmitter port including transmitter circuitry; and
a receiver port including receiver circuitry;
a Media Access Control (MAC) module;
a Reconciliation Sublayer (RS) module; and
a Peripheral Component Interconnect Express (PCIe) interface;
wherein the apparatus is configured to perform operations when operating including,
transmitting, during an Energy-Efficient Ethernet (EEE) Wake period, ALERT frames via the transmitter port to a receiver port of a link partner, the ALERT frames having a first length and being transmitted using Physical Media Attachment (PMA) framing logic employing frames having a second length different than the first length;
receiving ALERT frames transmitted from a transmitter port of the link partner at the receiver port of the apparatus, the ALERT frames that are received including frame alignment offset data identifying a relative offset between a start of an ALERT frame and a predetermined location in a PMA frame, and a countdown data value; and
employing the frame alignment offset data and the countdown data to facilitate a transition between the link training mode and a data mode.

24. The apparatus of claim 23, wherein an ALERT frame has a first length and a PMA frame has a second length comprising an integer multiple of the length of the ALERT frame.

25. The apparatus of claim 23, wherein the ALERT frame comprises a plurality of 92-bit terminated blocks (TB92), and the ALERT frame has a length of 58 TB92.

26. The apparatus of claim 23, wherein a current ALERT frame that is received includes data identifying a relative offset between the start of a following ALERT frame and the predetermined location in the PMA frame.

27. The apparatus of claim 23, wherein the apparatus comprises a 100 Gigabits per second Ethernet Network Interface Controller.

28. A system comprising:
a chassis;
an inter-plane, mounted within the chassis, having first and second inter-plane connectors and wiring coupled therebetween configured to facilitate a 100 Gigabits per second (Gbps) Ethernet link;
a first board having a first network interface controller (NIC) including 100 Gbps Ethernet transmitter and receiver ports operatively coupled to a first board connector that is coupled to the first inter-plane connector;
a second board having a second NIC including 100 Gbps Ethernet transmitter and receiver ports operatively coupled to a second board connector that is coupled to the second inter-plane connector,
wherein the first NIC is configured to perform operations when the system is operating including,
transmitting, during an Energy-Efficient Ethernet (EEE) Wake period, ALERT frames via the transmitter port to a receiver port of a link partner, the ALERT frames having a first length and being transmitted using Physical Media Attachment (PMA) framing logic employing frames having a second length different than the first length;
receiving ALERT frames transmitted from a transmitter port of the link partner at the receiver port of the apparatus, the ALERT frames that are received including frame alignment offset data identifying a relative offset between a start of an ALERT frame and a predetermined location in a PMA frame, and a countdown data value; and
employing the frame alignment offset data and the countdown data to facilitate a transition between the link training mode and a data mode.

29. The system of claim 28, wherein an ALERT frame has a first length and a PMA frame has a second length comprising an integer multiple of the length of the ALERT frame.

30. The system of claim 28, wherein a current ALERT frame that is received includes data identifying a relative offset between the start of a following ALERT frame and the predetermined location in the PMA frame.

* * * * *